(12) United States Patent
Kim et al.

(10) Patent No.: US 10,817,170 B2
(45) Date of Patent: Oct. 27, 2020

(54) APPARATUS AND METHOD FOR OPERATING TOUCH CONTROL BASED STEERING WHEEL

(71) Applicants: Hyundai Motor Company, Seoul (KR); Kia Motors Corporation, Seoul (KR); Impressivo Korea Inc., Seoul (KR)

(72) Inventors: Hyun-Sang Kim, Gyeonggi-do (KR); Jeong-Il Choi, Gyeonggi-do (KR); Yong-Soo Lee, Seoul (KR); Jung-Hyeon Gim, Seoul (KR); Young-Seok Ahn, Seoul (KR)

(73) Assignees: Hyundai Motor Company, Seoul (KR); Kia Motors Corporation, Seoul (KR); Impressivo Korea Inc., Seoul (KR)

( * ) Notice: Subject to any disclaimer, the term of this patent is extended or adjusted under 35 U.S.C. 154(b) by 0 days.

(21) Appl. No.: 16/203,133

(22) Filed: Nov. 28, 2018

(65) Prior Publication Data

US 2019/0291769 A1 Sep. 26, 2019

(30) Foreign Application Priority Data

Mar. 23, 2018 (KR) .................. 10-2018-0033820

(51) Int. Cl.
*G06F 3/0488* (2013.01)
*B62D 1/04* (2006.01)
(Continued)

(52) U.S. Cl.
CPC ......... *G06F 3/04883* (2013.01); *B60W 50/16* (2013.01); *B62D 1/046* (2013.01);
(Continued)

(58) Field of Classification Search
CPC ...... B60K 2370/1438; B60K 2370/143; B60K 2370/158; B60K 2370/782;
(Continued)

(56) References Cited

U.S. PATENT DOCUMENTS

| | | | |
|---|---|---|---|
| 9,081,479 B1* | 7/2015 | Fram | G06F 3/0236 |
| 2010/0100849 A1* | 4/2010 | Fram | G06F 3/0236 |
| | | | 715/835 |

(Continued)

FOREIGN PATENT DOCUMENTS

| | | | |
|---|---|---|---|
| JP | 2013119387 A | 6/2013 | |
| JP | 2015217813 A | 12/2015 | |

(Continued)

*Primary Examiner* — Sanjiv D. Patel
(74) *Attorney, Agent, or Firm* — Mintz Levin Cohn Ferris Glovsky and Popeo, P.C.; Peter F. Corless

(57) ABSTRACT

An apparatus for operating a touch control based steering wheel includes a touch sensor for generating sensor-related information by measuring a surface location and intensity of a steering wheel to sense a gesture, a control unit for performing a corresponding function by analyzing the sensor-related information to generate touch input pattern information, and selecting a predetermined control command depending upon the touch input pattern information, and a feedback circuit for providing a feedback depending upon the control command.

18 Claims, 20 Drawing Sheets

(51) Int. Cl.
  *G06F 3/041* (2006.01)
  *B60W 50/16* (2020.01)
  *B60W 50/14* (2020.01)

(52) U.S. Cl.
  CPC ..... *G06F 3/0416* (2013.01); *B60W 2050/146* (2013.01); *G06F 2203/04104* (2013.01); *G06F 2203/04808* (2013.01)

(58) Field of Classification Search
  CPC ........ B60K 2370/146; B60K 2370/145; B60K 2370/11; B62D 1/046; G06F 3/016; G06F 3/167; G06F 3/04817; G06F 3/017; G06F 3/011; G06F 3/04883; G06F 3/0488; G06F 3/04847; G06F 2203/04104; G06F 3/0482; G06F 3/03547; G06F 3/0416
  See application file for complete search history.

(56) References Cited

U.S. PATENT DOCUMENTS

| | | | |
|---|---|---|---|
| 2012/0179328 A1* | 7/2012 | Goldman-Shenhar | B62D 1/046 701/36 |
| 2013/0024071 A1* | 1/2013 | Sivertsen | B60K 35/00 701/41 |
| 2015/0022465 A1 | 1/2015 | Yamada | |
| 2015/0032322 A1* | 1/2015 | Wimmer | B60W 30/143 701/23 |
| 2015/0062118 A1* | 3/2015 | Ebner | B60K 37/06 345/419 |
| 2015/0097794 A1* | 4/2015 | Lisseman | G06F 3/167 345/173 |
| 2015/0158388 A1* | 6/2015 | Kalbus | B60K 35/00 701/36 |
| 2015/0307022 A1* | 10/2015 | Nelson | B62D 1/046 701/36 |
| 2016/0018891 A1* | 1/2016 | Levesque | G06F 3/044 345/174 |
| 2018/0136727 A1* | 5/2018 | Chandy | G06F 3/016 |

FOREIGN PATENT DOCUMENTS

| | | |
|---|---|---|
| KR | 2014-0138361 A | 12/2014 |
| KR | 10-1568248 B1 | 11/2015 |
| KR | 2016-0047204 A | 5/2016 |
| WO | 2014/015267 A2 | 1/2014 |

* cited by examiner

EXAMPLE OF INTER-VEHICLE DISTANCE SETTING
FUNCTION SELECTION METHOD

[EXAMPLE OF CALL FUNCTION SELECTION METHOD]

APPARATUS AND METHOD FOR OPERATING TOUCH CONTROL BASED STEERING WHEEL

CROSS-REFERENCE TO RELATED APPLICATION(S)

This application claims under 35 U.S.C. § 119(a) the benefit of Korean Patent Application No. 10-2018-0033820 filed on Mar. 23, 2018, the entire contents of which are incorporated herein by reference.

BACKGROUND

(a) Technical Field

The present disclosure relates to operating a steering wheel, more particularly, to an apparatus and method for operating a touch control based steering wheel, which can measure a touch location and a touch intensity in a front surface portion and/or a scope area of the steering wheel, and thus control a vehicle through a gesture input to provide visual/auditory/tactile feedback.

(b) Description of Related Art

Recently, there has been a tendency to utilize an impedance type touch sensor, such as a capacitive touch sensor and an inductive touch sensor. The impedance type touch sensor is superior in touch sensitivity and durability and is less influenced on display image quality than a resistive film type touch sensor, such as a pressure type touch sensor.

However, in such a touch sensor, since the touch intensity cannot be measured, there is a malfunction problem when the touch sensor is touched by mistake. In addition, when the user wears gloves or touches the touch surface with his/her nail, there is a problem in that a touch may not be recognized.

In addition, a technique is known for displaying visual feedback or a guide in response to a user's operation input to a touch pad. However, in this case, there is the disadvantage in that it is inconvenient because a visual guide is not displayed in response to the touch operation of the user.

In addition, since the direction of the touch pressure is not considered in recognizing the user's operation, there is a problem that the precise operation is not recognized.

The contents described in Description of Related Art are to help the understanding of the background of the present disclosure, and can include what is not previously known to those skilled in the art to which the present disclosure pertains.

SUMMARY

The present disclosure provides an apparatus and method for operating a touch control based steering wheel, which can measure a touch location and a touch intensity in a front surface portion and/or a scope area of a steering wheel.

In addition, the apparatus and method for operating the touch control based steering wheel incorporate a touch sensor, and are configured to control a vehicle though a gesture input to provide visual/auditory/tactile feedback.

In particular, the present disclosure provides an apparatus for operating a touch control based steering wheel, which can measure a touch location and a touch intensity in a front surface portion and/or a scope area of a steering wheel.

An apparatus for operating a touch control based steering wheel can include a touch sensor for generating sensor-related information by measuring a surface location and intensity of a steering wheel to sense a gesture; a control unit for performing a corresponding function by analyzing the sensor-related information to generate touch input pattern information, and selecting a predetermined control command depending upon the touch input pattern information; and a feedback circuit for providing a feedback depending upon the control command.

The control unit can include an analysis module for analyzing the gesture based on the sensor-related information; a selection module for selecting the control command with reference to the gesture and a predetermined command table; and a control module for controlling the feedback circuit by delivering the control command thereto.

In addition, the sensor-related information can include each unique identification sensor information, coordinates, and intensity information of the touch sensor.

In addition, the control command can be a command for executing a corresponding function, and the control command can be mapped to the gesture and the each unique identification sensor information.

In addition, the gesture can be a single gesture or a combination of a plurality of single gestures.

In addition, the single gesture can be any one of a first gesture for dragging in a specific direction after touching a specific portion to move a specific distance, a second gesture for pressing the specific portion during a specific time, a third gesture for pressing the specific portion at a specific intensity during the specific time, a fourth gesture for tapping at least once with at least one point during the specific time, a fifth gesture for inputting a character, a sixth gesture for dragging with the at least one point, a seventh gesture for adjusting the distance between two points, and a eighth gesture for pressing a touch surface of the touch sensor more than a specific area.

In addition, the feedback can be at least any one of a visual feedback for displaying on a display, an auditory feedback for outputting through a speaker, and a tactile feedback for outputting through a pulse.

In addition, the control command can include an input state flag for switching between a plurality of menu modes.

In addition, the touch sensor can be composed of a left touch sensor located on a left-side surface of the steering wheel, a central touch sensor located on the center thereof, and a right touch sensor located on a right-side surface thereof, and a haptic icon printed on the surface can be located thereon.

In addition, the function can be composed of an upper function and a lower function, and the left touch sensor and the right touch sensor can be selectively mapped to the upper function and the lower function.

In addition, the state for the function can be displayed in the form of an image and an icon.

In addition, a description screen for the function can be divided on the display with a user interface of the touch sensor, or displayed on an entire screen thereof.

In addition, the plurality of menu modes can be located in a clockwise direction upon each mode switching, and the information on a selectable function in the menu mode is posted by combining a text, an image, and an icon.

In addition, the currently selectable functions and the currently non-selectable functions upon each mode switching in the plurality of menu modes can variously post an icon, the size of an image, color, saturation, brightness, and transparency.

In addition, the plurality of menu modes can be located to overlap a part thereof upon each mode switching, and the currently selectable functions and the currently non-selectable functions can variously post an icon, the size of an image, color, saturation, brightness, and transparency.

In addition, the plurality of menu modes can be located in a clockwise directional donut shape without the mode switching, a corresponding function can be executed by successively executing a specific gesture at least once in a specific direction at the central point of the donut shape, and the currently selectable functions and the currently non-selectable functions can variously post an icon, the size of an image, color, saturation, brightness, and transparency.

Another embodiment of the present disclosure can provide a method of operating a touch control based steering wheel including generating, by a touch sensor, sensor-related information by measuring a surface location and intensity of a steering wheel to sense a gesture; executing, by a control unit, a corresponding function by analyzing the sensor-related information to generate touch input pattern information, and selecting a predetermined control command depending upon the touch input pattern information; and providing a feedback, by a feedback circuit, depending upon the control command.

The executing can include analyzing a gesture based on the sensor-related information; selecting a control command with reference to the gesture and a predetermined command table; and controlling it by delivering the control command to the feedback circuit.

According to the present disclosure, since the gesture including the predetermined intensity and the predetermined time of the touch sensor is used, it is possible to avoid a malfunction that a touch input is made by mistake.

In addition, another effect of the present disclosure is that it is possible to separately select the preferable function of the vehicle control functions and to map the specific gesture to the corresponding function, thus configuring a user-customized interface.

In addition, yet another effect of the present disclosure is that even if the same gesture input is performed, it is possible to execute various functions with reference to the input state flag, thus performing various inputs with a limited gesture.

DESCRIPTION OF SPECIFIC EMBODIMENTS

Figure 1:
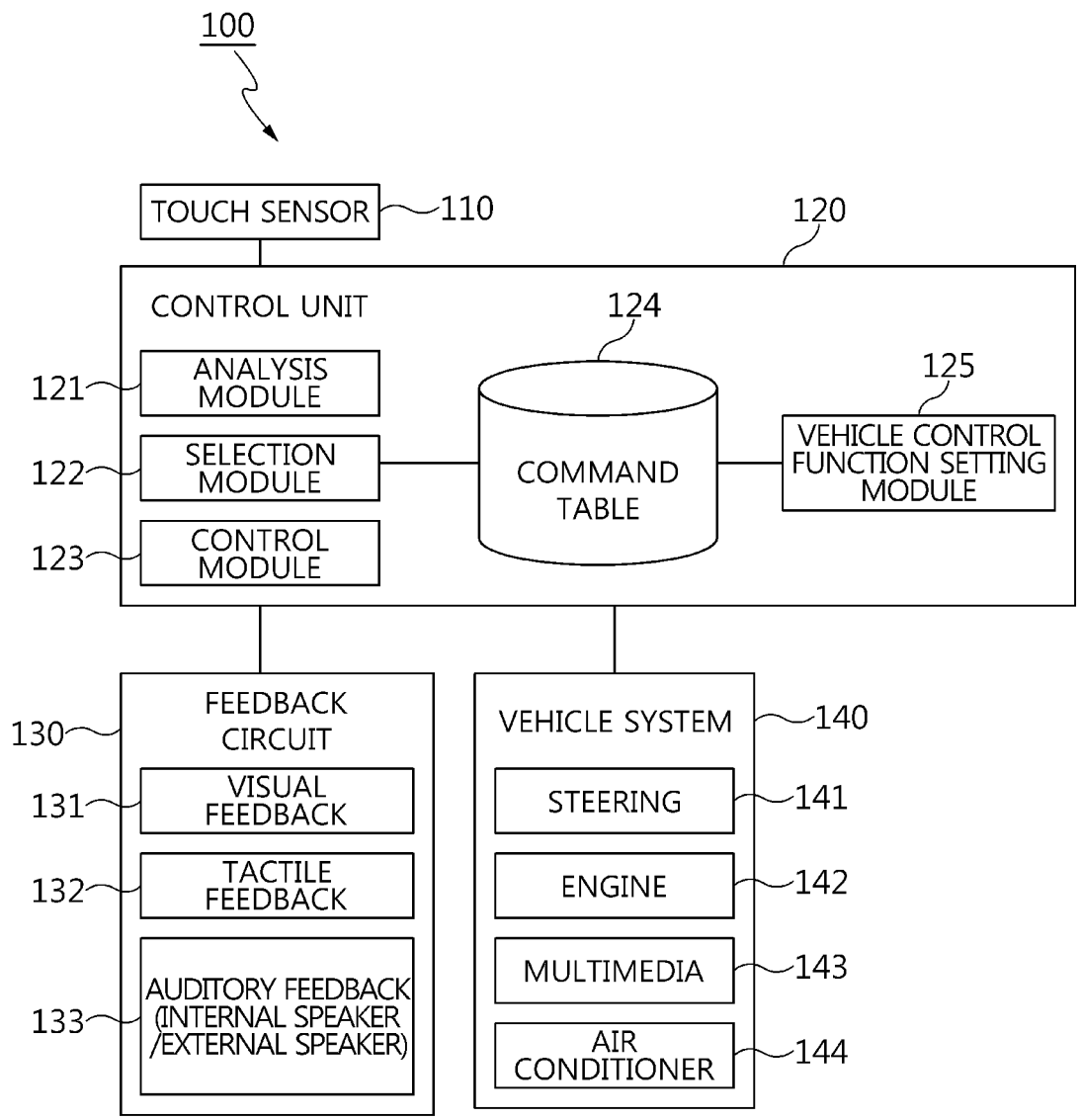
FIG. 1 is a block diagram illustrating an apparatus for operating a touch control based steering wheel in accordance with an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Various modifications and various embodiments can be made in the present disclosure, so that specific embodiments are illustrated in the drawings and described in detail in the specification. It should be understood, however, that it is not intended to limit the present disclosure to the particular disclosed forms, but includes all modifications, equivalents, and alternatives falling within the sprit and technical scope of the present disclosure.

Like reference numerals are used for like elements in describing each drawing. The terms "first," "second," and the like can be used to illustrate various components, but the components should not be limited by the terms. The terms are used to differentiate one element from another.

For example, a first component can be referred to as a second component, and similarly, the second component can be also referred to as the first component without departing from the scope of the present disclosure.

Unless otherwise defined, all terms including technical and scientific terms used herein have the same meaning as commonly understood by one of ordinary skill in the art to which the present disclosure belongs.

It will be further understood that terms, such as those defined in commonly used dictionaries, should be additionally interpreted as having a meaning that is consistent with their meaning in the context of the relevant art, and will not be interpreted in an idealized or overly formal sense unless expressly so defined in the application.

Hereinafter, an apparatus and method for operating a touch control based steering wheel in accordance with an embodiment of the present disclosure will be described in detail with reference to the accompanying drawings.

FIG. 1 is a block diagram illustrating an apparatus for operating a touch control based steering wheel 100 in accordance with an embodiment of the present disclosure. Referring to FIG. 1, an apparatus for operating a touch control based steering wheel 100 includes a touch sensor 110 for generating sensor-related information by measuring a surface location and intensity of a steering wheel to sense a gesture, a control unit 120 for executing a corresponding function by analyzing the sensor-related information to generate touch input pattern information and selecting a predetermined control command depending upon the touch input pattern information, a feedback circuit 130 for providing feedback depending upon the control command, a vehicle system 140 for executing the corresponding function depending upon the control of the control unit 120, etc.

Figure 3:
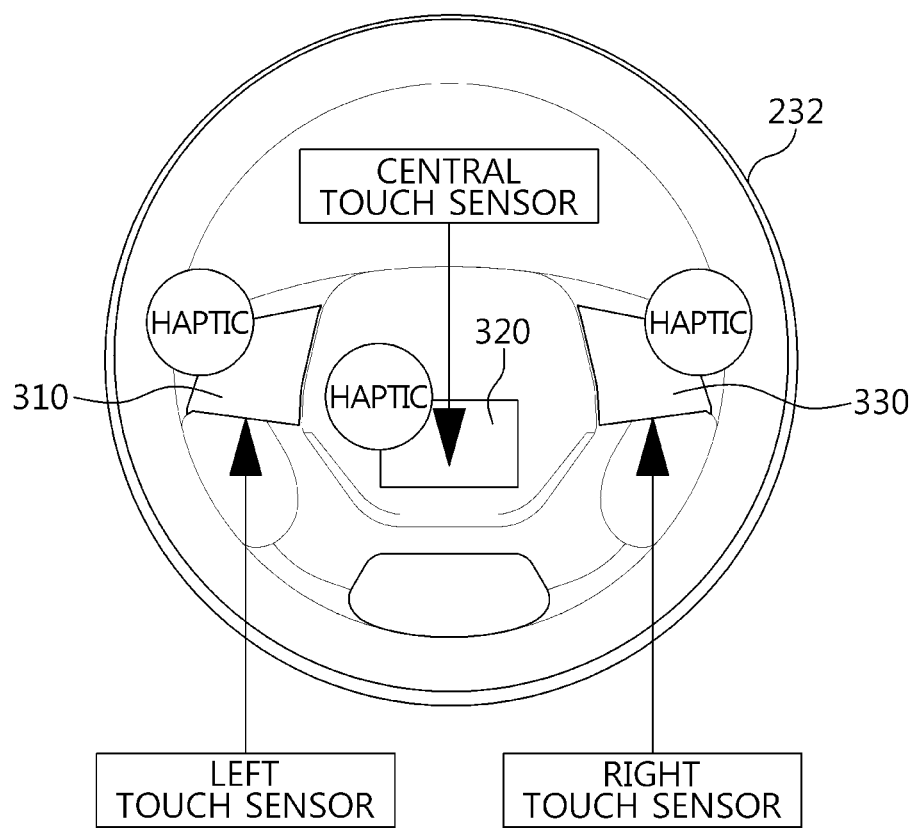
FIG. 3 is an example of a function icon printed on the surface of the touch sensor illustrated in FIG. 1.

The touch sensor 110 is located on the surface of the steering wheel, as shown in FIG. 3 (to be described later).

Referring again to FIG. 1, the control unit 120 can be configured to include an analysis module 121 for analyzing a gesture based on the sensor-related information, a selection module 122 for selecting a control command with reference to a predetermined command table 124, a control module 123 for controlling it by delivering the control command to the feedback circuit 130, a vehicle control function setting module 125 for generating the command table 124, etc.

The analysis module 121 analyzes the gesture based on the sensor-related information of the touch sensor 110. The sensor-related information can include unique identification sensor information (i.e., a touch sensor ID) of the touch sensor, coordinates of the touch sensor, intensity information of the touch sensor, etc. Accordingly, the analysis module 121 can analyze the gesture using the information. These gestures are illustrated in the following Table.

TABLE 1

| Gesture | Input method |
| --- | --- |
| Swipe Up/Down/ Left/Right | After touching any portion of a touch sensor, drag in any one direction of Up/Down/Left/Right to move by a predetermined distance or more within a predetermined time |
| Long Touch | Press any portion of a touch sensor during a predetermined time or more |
| Force Touch | Press any portion of a touch sensor at a predetermined intensity or more |
| Swipe Up/Down/ Left/Right & Long Touch | After touching any portion of a touch sensor, drag in any one direction of Up/Down/Left/Right to move by a predetermined distance or more within a predetermined time, and press at a specific portion during a predetermined time or more without moving more |
| Swipe Up/Down/ Left/Right & Force Touch | After touching any portion of a touch sensor, drag in any one direction of Up/Down/Left/Right to move by a predetermined distance or more within a predetermined time, and press at a specific portion at a predetermined intensity or more without moving more |
| Long Touch & Swipe Up/Down/ Left/Right | Press any portion of a touch sensor during a predetermined time or more, drag in any one direction of Up/Down/Left/Right to move by a predetermined distance or more |
| Force Touch & Swipe Up/Down/ Left/Right | Press any portion of a touch sensor at a predetermined intensity or more, drag in any one direction of Up/Down/Left/Right to move by a predetermined distance or more |
| One Finger Double Tap | Tap double with one point (e.g., one finger) within a predetermined time |
| Handwriting Input | Input a character |
| Two Finger One Tap | Tap once two points (e.g., two fingers) simultaneously |
| One Finger Drag | Drag with one point (e.g., one finger) |
| Pinch Zoom In/Out | Based on an initial distance between two points (e.g., two fingers), 1) Pinch Zoom In when the distance between two points is gradually increased 2) Pinch Zoom Out when the distance between two points is gradually decreased |
| Palm Touch | Press a touch surface of a touch sensor more than a predetermined area or more, Or press a touch surface of a touch sensor during a predetermined time or more or at a predetermined intensity or more while pressing it more than a predetermined area or more |

The selection module 122 selects a command with reference to the analyzed gesture and the command table.

The control module 123 controls the feedback circuit and the vehicle system by delivering the command to them.

The command table 124 is generated by the vehicle control function setting module 125, and has vehicle control function matching information for a touch sensor ID and a gesture as a reference table for selecting the command. In addition, it has feedback information to be provided.

The vehicle control function setting module 125 groups and tiers a series of functions of vehicles to be controlled. The command table 124 is generated by mapping the touch sensor ID and the gesture for each function.

The feedback circuit 130 is composed of a visual feedback 131, a tactile feedback 132, an auditory feedback 133, etc.

The vehicle system 140, as a hardware component installed in a vehicle, can include a steering system 141, an engine 142, a multimedia 143, an air conditioner 144, etc. Accordingly, the vehicle system 140 executes the function and operation of the vehicle corresponding to the command of the control module 123.

The term of "~module" illustrated in FIG. 1 means a unit for processing at least one function or operation, which can be implemented by hardware, software, or a combination of hardware and software. The hardware can be implemented by an Application Specific Integrated Circuit (ASIC) designed for performing the above function, a Digital Signal Processing (DSP), a Programmable Logic Device (PLD), a Field Programmable Gate Array (FPGA), a processor, a controller, a microprocessor, another electronic unit, or a combination thereof. The software can be implemented by a module performing the above functions. The software can be stored in a memory unit, and executed by a processor. The memory unit or the processor can adopt various means well known to those skilled in the art.

Figure 2:
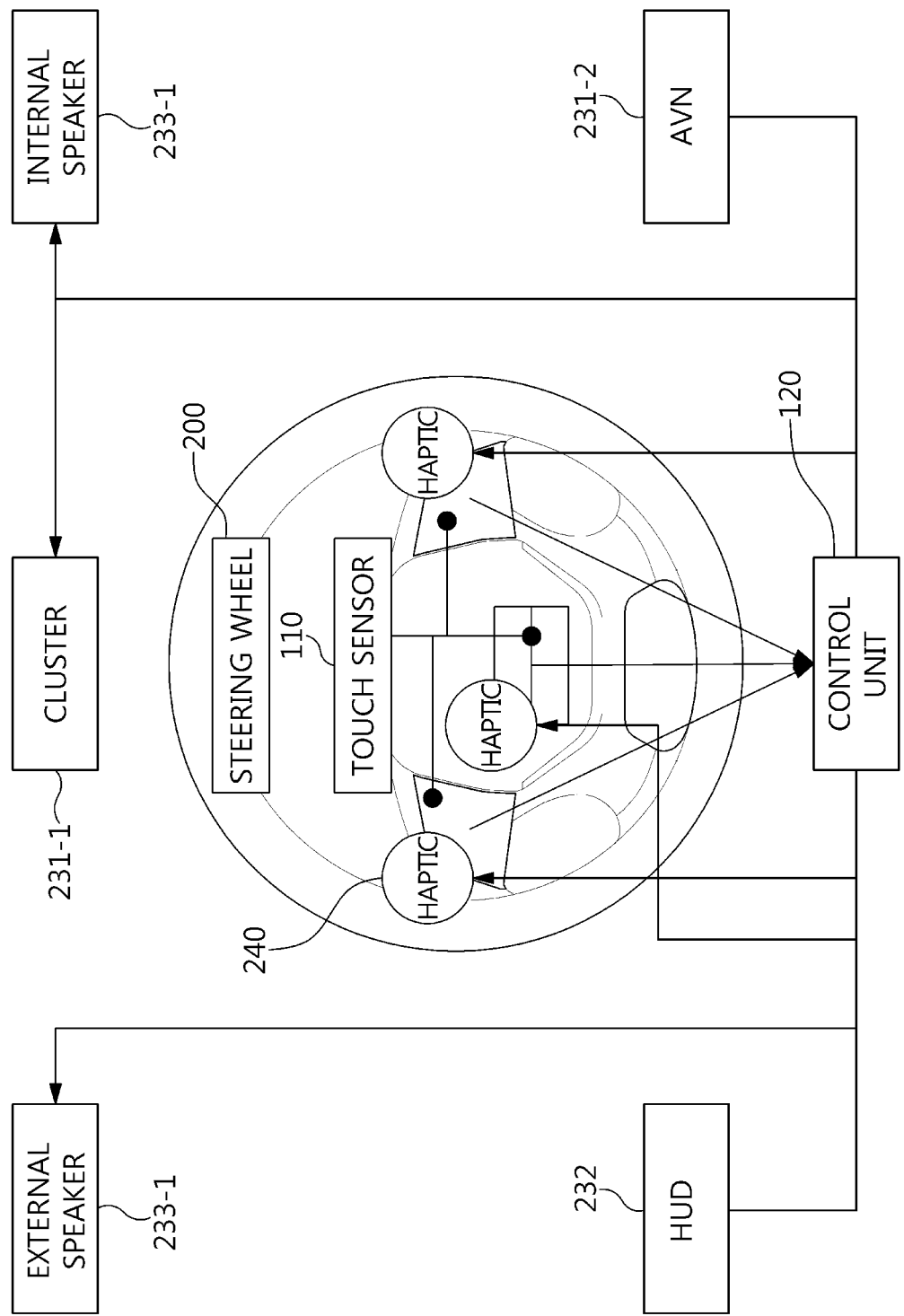
FIG. 2 is a diagram illustrating a configuration example of a feedback circuit illustrated in FIG. 1.

FIG. 2 is a diagram illustrating a configuration example of the feedback circuit illustrated in FIG. 1. Referring to FIG. 2, a user's command is delivered to the control unit 120 through the touch sensor 110 installed on a steering wheel 200 and is fed back. The visual feedback 131 provides visual feedback corresponding to the command. In addition, a graphic (e.g., an icon) corresponding to the selected command is displayed through in-vehicle displays 232, 231-1, 231-2. In addition, it can provide a continuous graphic (e.g., animation) of a location, a path, and an intensity that the user is pressing the touch sensor 110. A plurality of graphics (e.g., icons) corresponding to a series of commands in the predetermined command table can be pre-posted on the displays 232, 231-1, 231-2.

The display can be a Head Up Display (HUD) 232, a cluster 231-1, an Audio Visual Navigation (AVN) 231-2, etc. In addition, such a display can be a Liquid Crystal Display (LCD), a Light Emitting Display (LED), an Organic Light Emitting Display (OLED), a flexible display, a touch screen, etc.

The tactile feedback 132 provides a tactile feedback to the user. For example, it is installed on the steering wheel to provide vibration to the user. In addition, a haptic sensor (e.g., a motor) 240 is applied that can provide a haptic feedback to a specific portion of the steering wheel 200. The control unit 120 can select a command and provide the haptic feedback corresponding to the command. The haptic feedback can have various patterns depending on the combination of 'a vibration intensity, a holding time.' A haptic actuator (not illustrated) can be located near the touch sensor in order for the user to easily receive the haptic feedback. It can be located at a specific portion of the steering wheel where the user's hand reaches before or after the touch input. For example, every time a command is selected, a vibration feedback is provided at an interval of 100 ms, such that the user can recognize a vibration feedback pattern and tactually confirm whether or not the user has performed the touch input properly.

The auditory feedback 133 provides an auditory feedback corresponding to the command. For this purpose, a speaker, etc. is constituted. The speaker can be a speaker installed inside and outside the vehicle. An external speaker 233-1, as a trigger device for activating a digital horn, can be interlocked with the touch sensor 110, and can output a horn sound through the speaker of the vehicle. For example, when the touch sensor 110 applied to the center of the steering wheel is pressed with a palm, the digital horn is activated. The size of the horn output sound can be determined in proportion to the intensity pressing the touch sensor 110.

An internal speaker 233-2 can output a sound corresponding to a corresponding command value when the command value is selected in the selection module (122 in FIG. 1). For example, every time a command value is selected, a beep sound can be output so that the user can hear the sound and know whether or not the touch input has been performed properly. In this time, the sound output device can be located inside the vehicle. Although the touch sensor 110 is illustrated as one unit in FIG. 2, it can be composed of several touch sensors. In addition, it can be configured to have one touch sensor at the left, center, and right sides, respectively.

FIG. 3 is an example of a function icon printed on the surface of the touch sensor illustrated in FIG. 1. Referring to FIG. 3, a left function icon 310 indicating a left touch sensor, a central function icon 320 indicating a central touch sensor, and a right function icon 330 indicating a right touch sensor are configured. Accordingly, it is possible to map functions for controlling the vehicle depending upon the location of the touch sensor applied to the left, center, and right thereof, and the manner of inputting the touch sensor (i.e., the gesture).

For example, the upper function can map to the left touch sensor, and the lower function can map to the right touch sensor. When a gesture input is performed in the left touch sensor and one of the upper functions is executed, the right gesture input is automatically mapped to the lower function that is dependent on the upper function. A series of functions for controlling the vehicle with the touch sensor can be selected. In addition, each function can be grouped by their similar nature depending upon the control type. Each function of a group can include a lower function related to the corresponding function. For example, a multimedia mode, a call function, a mute function, a voice recognition function, etc. have a common function in connection with voice information. Then, an inter-vehicle distance setting function, a cruise function, external/internal air circulation function, and a dashboard function have a common function in connection with the vehicle driving. Accordingly, each function can be grouped into 'a Media Mode' and 'a Drive Mode'. Each function can include a lower function related to the corresponding function. For the lower function, it can be the channel change, the volume adjustment, etc. in the Media Mode. It can be the speed change, Confirm, menu movement, etc. in the Drive Mode.

In this time, the display can provide a user interface for function mapping. A sensor location, a gesture, a function layer, and a performance function are as follows.

TABLE 2

| Sensor location | Gesture | Function layer | Performance function |
| --- | --- | --- | --- |
| Left | Swipe Up | Multimedia upper function | Switch AV each mode |
| | Swipe Up & Long (Force) Touch | | Quickly switch AV each mode |
| | Long (Force) Touch & Swipe Up | | Perform AV ON/OFF operation |
| Right | Swipe Down | Multimedia lower function | Adjust volume |
| | Swipe Up | | |
| | Swipe Down & Long (Force) Touch | | Quickly adjust volume |
| | Swipe Up & Long (Force) Touch | | |

TABLE 2-continued

| Sensor location | Gesture | Function layer | Performance function |
|---|---|---|---|
| | Swipe Left Swipe Right | | Change a radio frequency, broadcast, channel, etc. |
| | Swipe Left & Long (Force) Touch | | Quickly change a radio frequency, broadcast, channel, etc. |

The upper/lower functions mapped to each of the left user interface and the right user interface can be changed by a user setting. For example, a left-handed user can map the lower function to the left user interface and the upper function to the right user interface.

For example, the upper function in the Media Mode can be mapped to the left touch sensor, and the lower function of each function can be mapped to the right touch sensor. In addition, for example, when a Swipe Up gesture is performed in the left touch sensor, it can map with a multimedia function for switching an Audio Video (AV) each mode of the vehicle. In addition, for example, when the Swipe Up & Long (Force) Touch gesture is performed in the left touch sensor, it can map with the multimedia function for quickly switching the AV each mode of the vehicle. In addition, for example, when a Swipe Down gesture is performed in the right touch sensor, it can be mapped with a function of reducing the volume of the in-vehicle speaker. In addition, an icon and image printing representing the function (upper/lower functions) can be applied to the surface of the touch sensor.

Accordingly, a series of functions of the vehicle to be controlled can be grouped into a plurality of modes, and the functions can be layered into the upper function and the lower function depending upon the grouping. The command table can be generated by mapping the touch sensor ID and the gesture for each function. An example of the command table is as follows.

TABLE 3

| Mode | Function | Touch sensor ID | Gesture | Command | Feedback type | Performance Function |
|---|---|---|---|---|---|---|
| Switching mode | Input state flag switching | Left | One Finger Double Tap | CMD (MODE_SWITCH) | *Visual feedback - HUD *Auditory feedback - internal speaker *Tactile feedback - One pulse | *Input state flag update 'Media Mode' and 'Drive Mode' |
| Media Mode | Multimedia mode - upper function | Left | Swipe Up | CMD (MULTIMEDIA, TUNE) | *Visual feedback - HUD, AVN *Tactile feedback - One pulse | *Every time a corresponding gesture is performed, switch an AV each mode. *When the power is off, press the key to turn off the power |
| | Multimedia mode - lower function | Right | Swipe Down | CMD (VOL_DOWN) | *Visual feedback - HUD, AVN *Auditory feedback - internal speaker *Tactile feedback - One pulse | *Adjust volume |
| Drive Mode | Cruise - upper function | Left | Swipe Right | CMD (CRUISE, ON) | *Visual feedback - HUD, Cluster *Auditory feedback - internal speaker *Tactile feedback - One pulse | *Activate cruise mode (a cruise indicator light on a dashboard is turned on) |
| | Cruise - lower function | Right | Long (Force) Touch (Center Tap) | CMD (CRUISE, CONFIRM) | *Visual feedback - HUD, Cluster *Auditory feedback - internal speaker *Tactile feedback - Two pulse | *After activating a cruise mode, maintain a corresponding speed upon taking a corresponding gesture when a required speed has been reached by pressing an acceleration pedal |
| | | | Swipe Up & Long (Force) Touch | CMD (VELOCITY_UP_FAST) | *Visual feedback - HUD, Cluster *Auditory feedback - internal speaker *Tactile feedback - Multiple pulse | *Increase a setting speed by 10 times |
| Navigation Mode | Navigation - upper function | Middle | Handwriting Input | CMD (NAVIGATION, CHARACTER_RECOGNITION) | *Visual feedback - HUD, AVN | *Input a character by a handwriting |
| | | | Pinch Zoom Out | CMD (NAVIGATION, ZOOM_OUT) | *Visual feedback - HUD, AVN | *Reduce a map |
| Horn | Horn - upper function | Middle | Palm Touch | CMD (HORN_ON) | *Auditory feedback - external speaker | *Activate horn sound |

In the above Table 3, the switching mode is a function of switching the 'Media Mode, Drive Mode'. When the corresponding function is executed, the input state flag is updated to execute various functions even in the same gesture. The touch sensor ID can be divided into Left, Right, and Middle depending upon the location of the touch sensor.

The command is a command for delivering to the feedback circuit and the vehicle system. For example, the CMD (MODE_SWITCH) command updates the input state flag. Since the corresponding command is not a command for vehicle control, it is delivered only to the feedback circuit. For example, the CMD (MULTIMEDIA, TUNE) command is delivered to the feedback circuit and the vehicle system, and the function of switching the AV each mode of the multimedia mode function is executed.

The feedback type receives a command and provides visual/auditory/tactile feedback appropriate for the corresponding command. The executed function selects the command based on the input state flag and the gesture input, and executes the function corresponding to the corresponding command.

Table 3, as described above, is only an example for a clear understanding of the present disclosure, and various combinations and deformations are possible.

Figure 4:
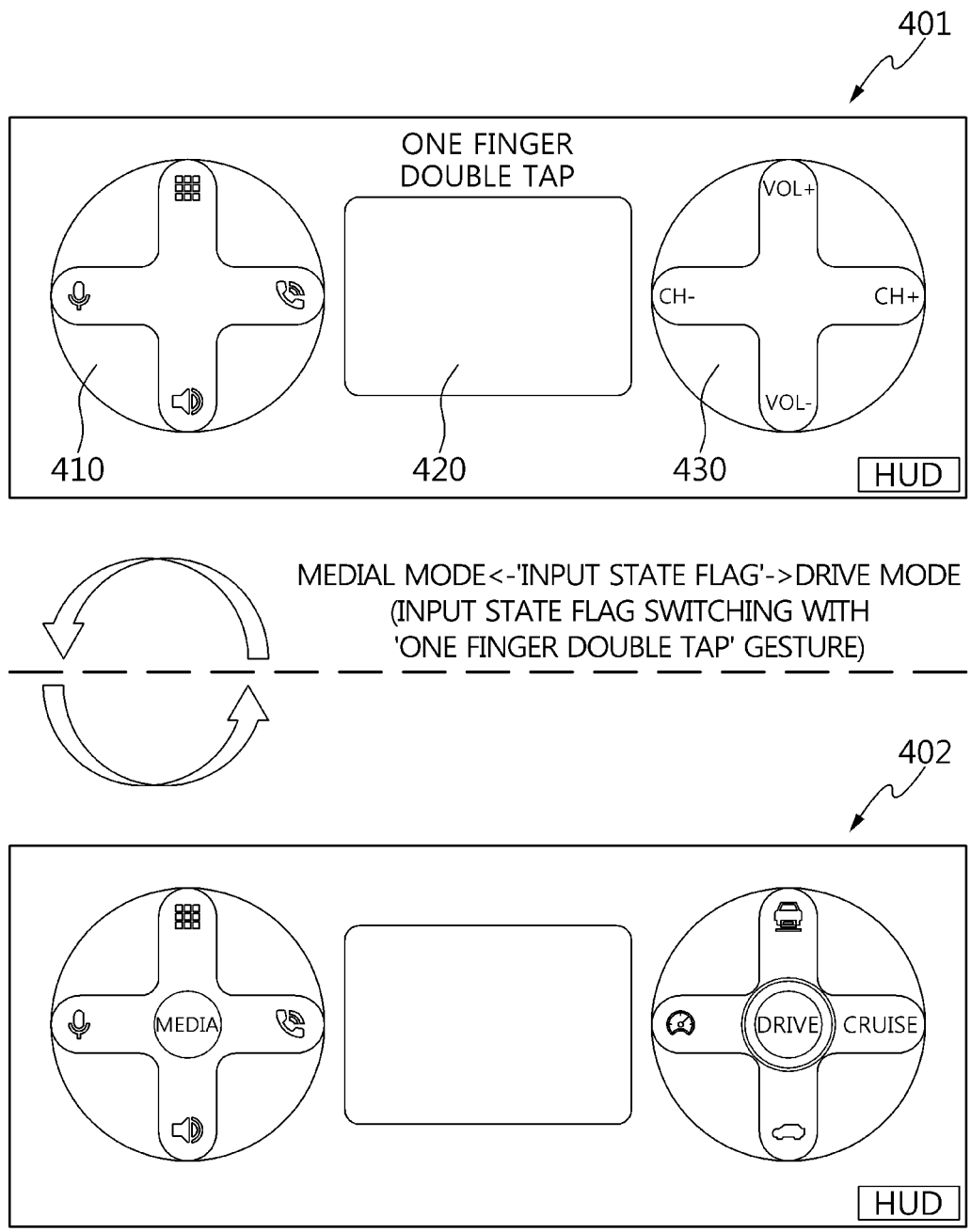
FIG. 4 is an example of a gesture input for switching an input state flag on a user interface mapped to a touch sensor in accordance with an embodiment of the present disclosure.

FIG. 4 is an example of a gesture input for switching an input state flag on a user interface 401 mapped to a touch sensor in accordance with an embodiment of the present disclosure. That is, it is changed to a user interface 402 after switching by the gesture for switching from the user interface 401 before switching. A left touch sensor icon 410, a central touch sensor icon 420, and a right touch sensor icon 430 are located in the user interfaces 401 and 402.

Referring to FIG. 4, even if the same gesture input is performed, various functions can be performed depending upon the input state flag. For example, when an initial state is in the Media Mode, the input state flag refers to the Media Mode. Accordingly, when the gesture input is performed in the left touch sensor 310, a multimedia function, a call function, a mute function, and a voice recognition function, which are the function in the Media Mode, are performed.

When the 'One Finger Double Tap' gesture is executed in the left touch sensor icon 410, the input state flag refers to the Drive Mode. Upon a gesture input, setting and preparation are made for performing 'an inter-vehicle distance setting function', 'a cruise function, external/internal air circulation functions, and a dashboard function' that are the function in the Drive Mode. In this time, the UI of the HUD is switched from a Media Mode UI to a Drive Mode UI, which can help the user visually check the input state flag.

Help and icon/image can be posted on the UI of the HUD in order to recognize a user that the input state flag can be switched with a specific gesture (e.g., One Finger Double Tap). In addition, since each mode can be switched with the input state flag, more functions can be performed with a limited number of gestures.

Figure 5:
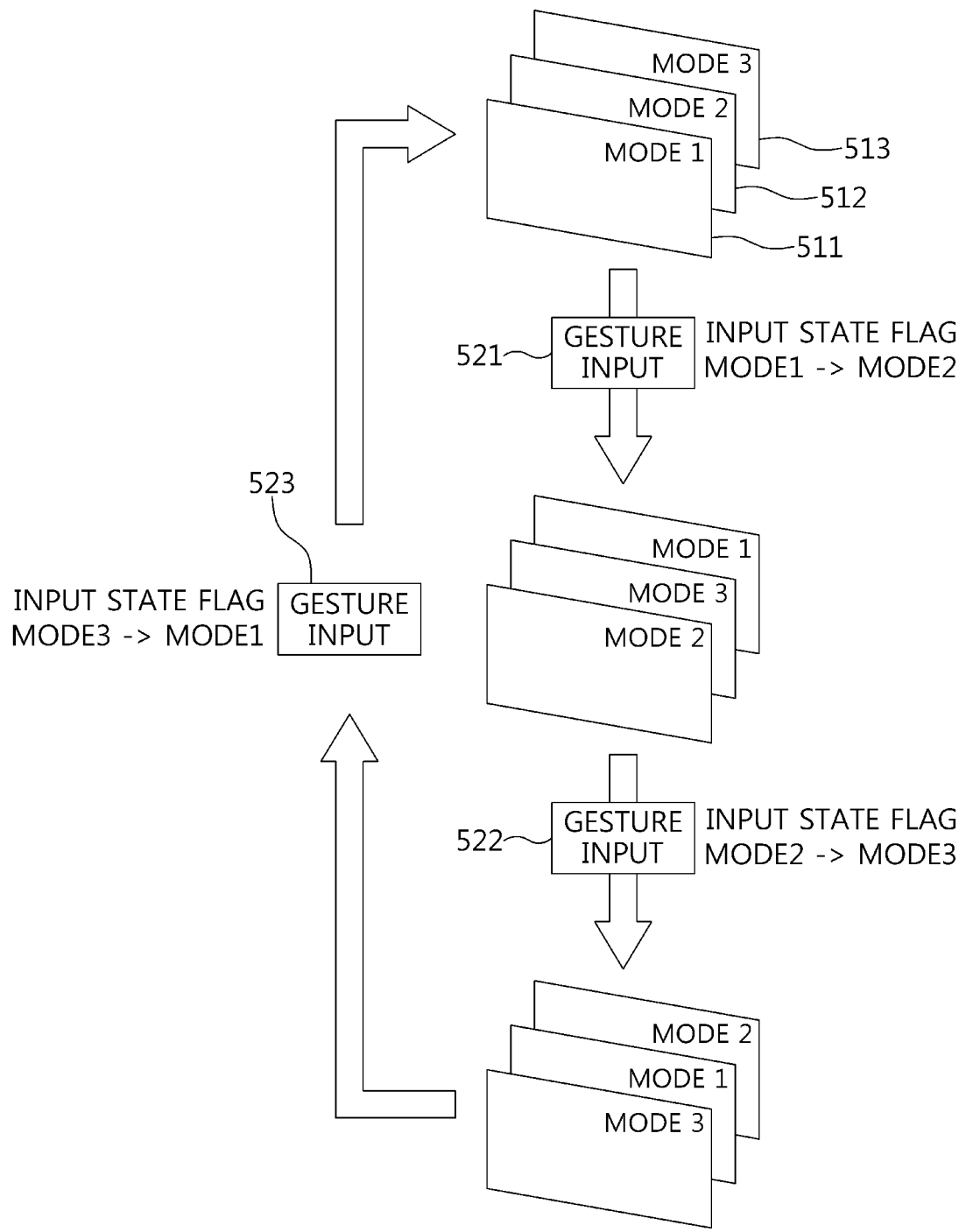
FIG. 5 is a conceptual diagram of an input state flag switching and a mode switching through a gesture input in a plurality of modes in accordance with an embodiment of the present disclosure.

FIG. 5 is a conceptual diagram of an input state flag switching and a mode switching through a gesture input in a plurality of modes in accordance with an embodiment of the present disclosure. Referring to FIG. 5, even when the number of modes is two or more, a mode switching can be performed by switching the input state flag by a gesture input. For example, when the number of modes is 3, the input state flag can refer to each mode as a circulation structure such as the 'MODE1 511→MODE2 512→MODE3 513→MODE1 511→MODE2 512→ . . . ' every time predetermined gesture inputs 521, 522, 523 are performed.

Figure 6:
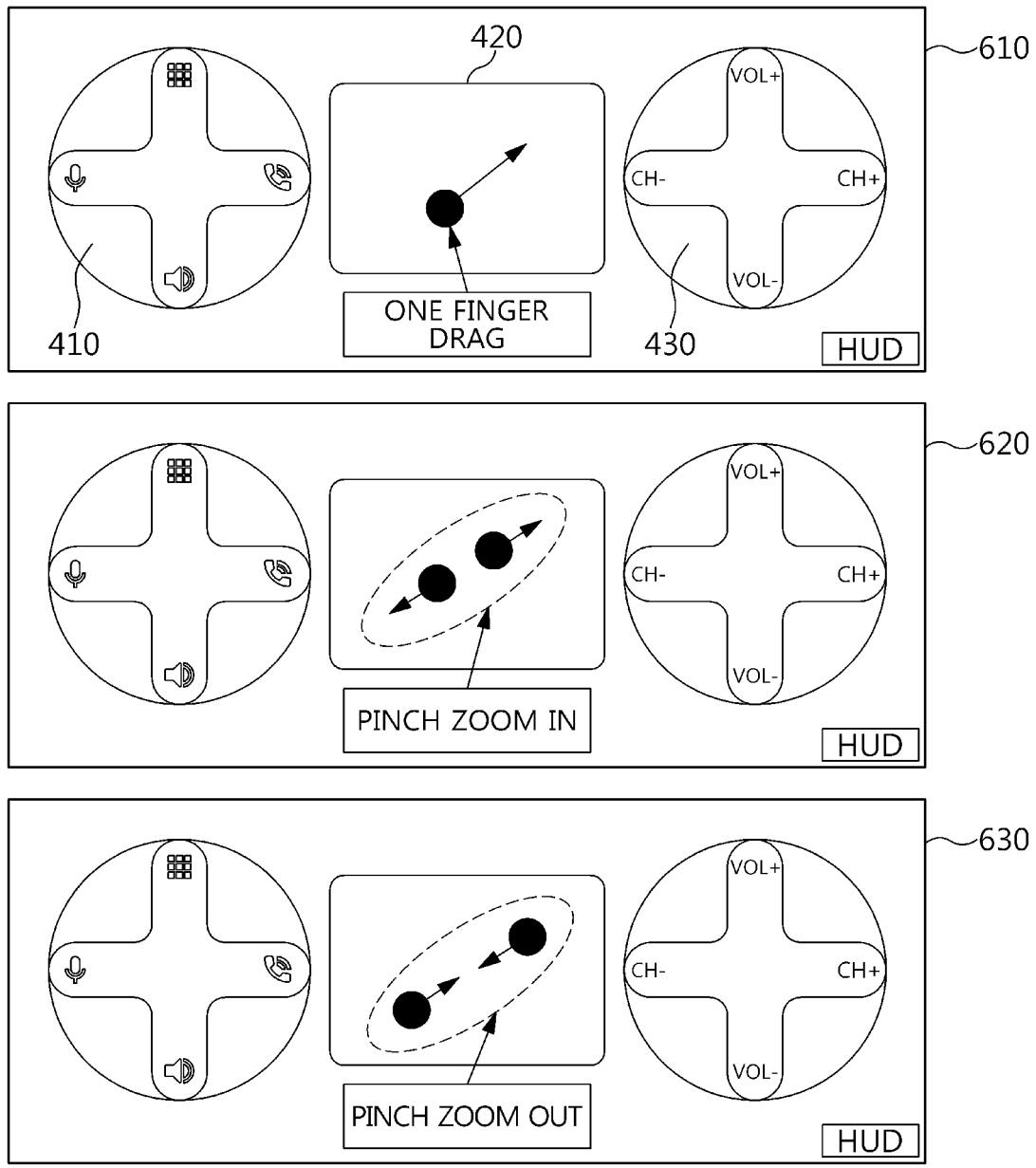
FIG. 6 is an example of a gesture input for a navigation and a map control on a user interface in accordance with an embodiment of the present disclosure.

FIG. 6 is an example of a gesture input for a navigation and a map control on a user interface in accordance with an embodiment of the present disclosure. Referring to FIG. 6, an One Finger Drag gesture 610, a Pinch Zoom In gesture 620, and a Pinch Zoom Out gesture 630 can be displayed on the display of the vehicle on the central touch sensor icon 420 for a navigation and a map control.

In addition, when the input of the One Finger Drag gesture 610 is performed in the central touch sensor (320 in FIG. 3), the map posted on the vehicle display is moved. When the input of the Pinch Zoom In gesture 620 is performed in the central touch sensor 320, the map posted on the display of the vehicle is enlarged. When the input of the Pinch Zoom Out gesture 630 is performed in the central touch sensor 320, the map posted on the vehicle display is reduced upon a gesture input.

Meanwhile, a certain portion of the central touch sensor 320 can be touched to activate the horn of the vehicle. For example, a digital horn is activated when a touch input occurs beyond a predetermined area of the central touch sensor. In addition, the volume of the digital horn can be adjusted depending upon the touch intensity. The intensity of pressing the touch sensor and the external speaker volume (e.g., the volume of the digital horn) can be proportionally operated. For example, the intensity of pressing the touch sensor and the digital horn can be linearly in direct proportion to each other. In this time, when the touch input occurs at a predetermined intensity or more, the volume of the digital horn can be adjusted in direct proportion thereto. In addition, for another example, the intensity of pressing the touch sensor and the digital horn can be nonlinearly in direct proportion thereto. In this time, the volume of the digital horn can be adjusted nonlinearly in direct proportion thereto when the touch input occurs at the predetermined intensity or more.

Figure 7:
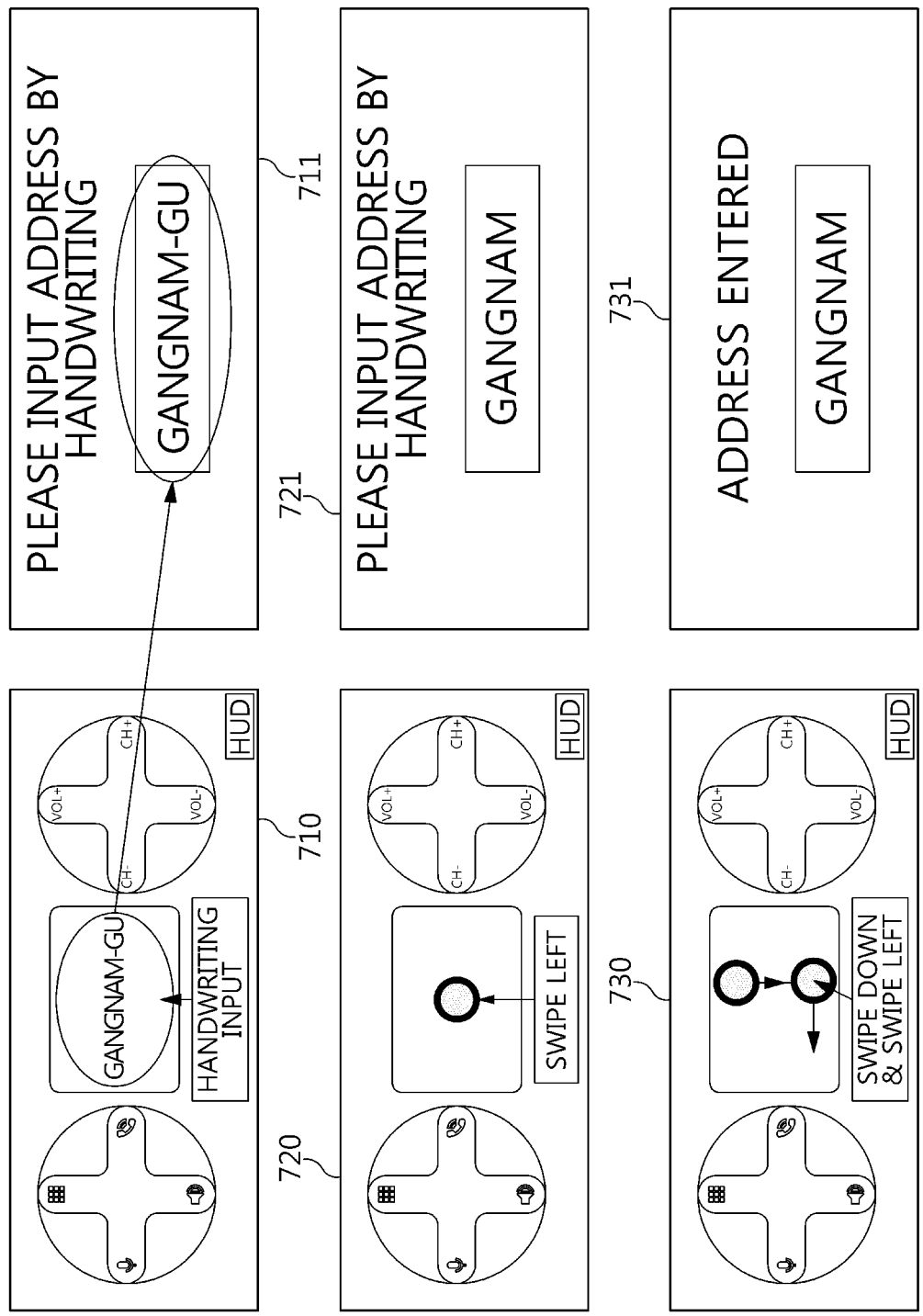
FIG. 7 is a screen example of a gesture input for a handwriting input and the result therefrom on a user interface in accordance with an embodiment of the present disclosure.

FIG. 7 is a screen example of a gesture input for a handwriting input and the result therefrom on a user interface in accordance with an embodiment of the present disclosure. Referring to FIG. 7, a handwriting input can be performed in the central touch sensor to input a character, a number, etc. For example, a gesture input can be performed to input an address in a navigation and a map.

For example, when 'Gangnam-gu' is input in the central touch sensor (320 in FIG. 3), 'Gangnam-gu' that is being input in the central user interface (UI) of the display is displayed and analyzed 710. In this time, the analyzed information is displayed on the display 711. The display can be a HUD, an AVN, a smartphone, etc.

Meanwhile, when the user wants to delete the input character, one character of the input character string is deleted when a Swipe Left gesture is performed in the central touch sensor 320 720. That is, the word 'gu' is deleted from 'Gangnam-gu' and 'Gangnam' is displayed on the display 721.

In addition, when a Swipe Down & Swipe Left gesture is performed as a confirm command for searching for the currently inputted character by the address, 'Gangnam' is searched as the address 730. That is, the address searched as 'Gangnam' is displayed on the display 731.

Figure 8:
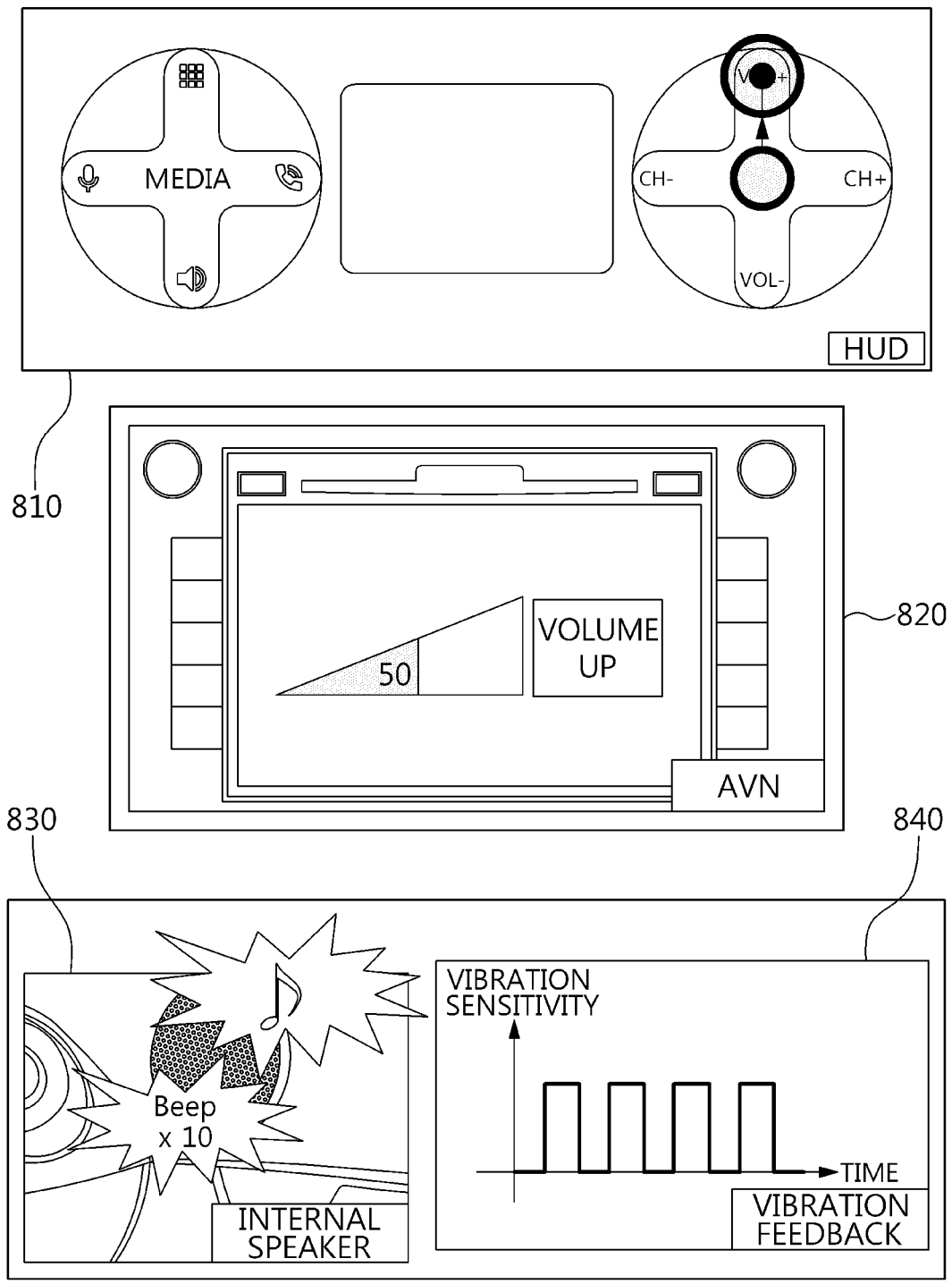
FIG. 8 is an example of a gesture input for a multimedia function operation and the result therefrom on a user interface in accordance with one embodiment of the present disclosure.

FIG. 8 is an example of a gesture input for a multimedia function operation and the result therefrom on a user interface in accordance with an embodiment of the present disclosure. Referring to FIG. 8, when a Swipe Up & Long Touch or Swipe Up & Force Touch gesture is performed in the right touch sensor (330 in FIG. 3), a function of rapidly increasing the volume, which is the lower function of the multimedia function, is executed. In this time, the volume inside the vehicle rapidly becomes large.

In this time, the input and path for the Swipe Up & Long Touch or Swipe Up & Force Touch gesture can be displayed on the right UI of the HUD as the visual feedback 810. The color of the 'VOL+icon' in the Audio Video Navigation (AVN) can be displayed differently from before the gesture input 820.

The UI related with the multimedia mode can be displayed on the AVN. For example, a volume-related UI explaining a state in which the volume is increasing can be displayed thereon. As the auditory feedback, the beep sound from the in-vehicle speaker can be successively played multiple times 830. In this time, the beep effect sound and the in-vehicle sound (e.g., music, call voice, etc.) can be simultaneously played back. As the tactile feedback, the haptic sensor near the steering wheel can provide vibration 840. In this time, the pattern of vibration can be provided in the form of Multiple Pulse.

Of course, FIG. 8 is one example, and in addition, it is possible to variously configure the gesture input for the multimedia function operation and the result therefrom. For example, the left UI of the HUD at an initial stage is set to the Media Mode. The right UI of the HUD can be set to a N/A (not available) UI state that cannot be input, or to the lower function that is dependent on the multimedia function as the default UI. In addition, the number of beep sound can be variously reproduced, and the pattern of vibration can be in the form of one pulse. In addition, a mute can be displayed. In addition, when the Long Touch & Swipe Up or Force Touch & Swipe Up gesture is performed in the left touch sensor, AV mode termination among the multimedia functions can be executed. In addition, when the One Finger Double Tap gesture is performed in the left touch sensor, it can be switched from the Media Mode to the Drive Mode.

Figure 9:
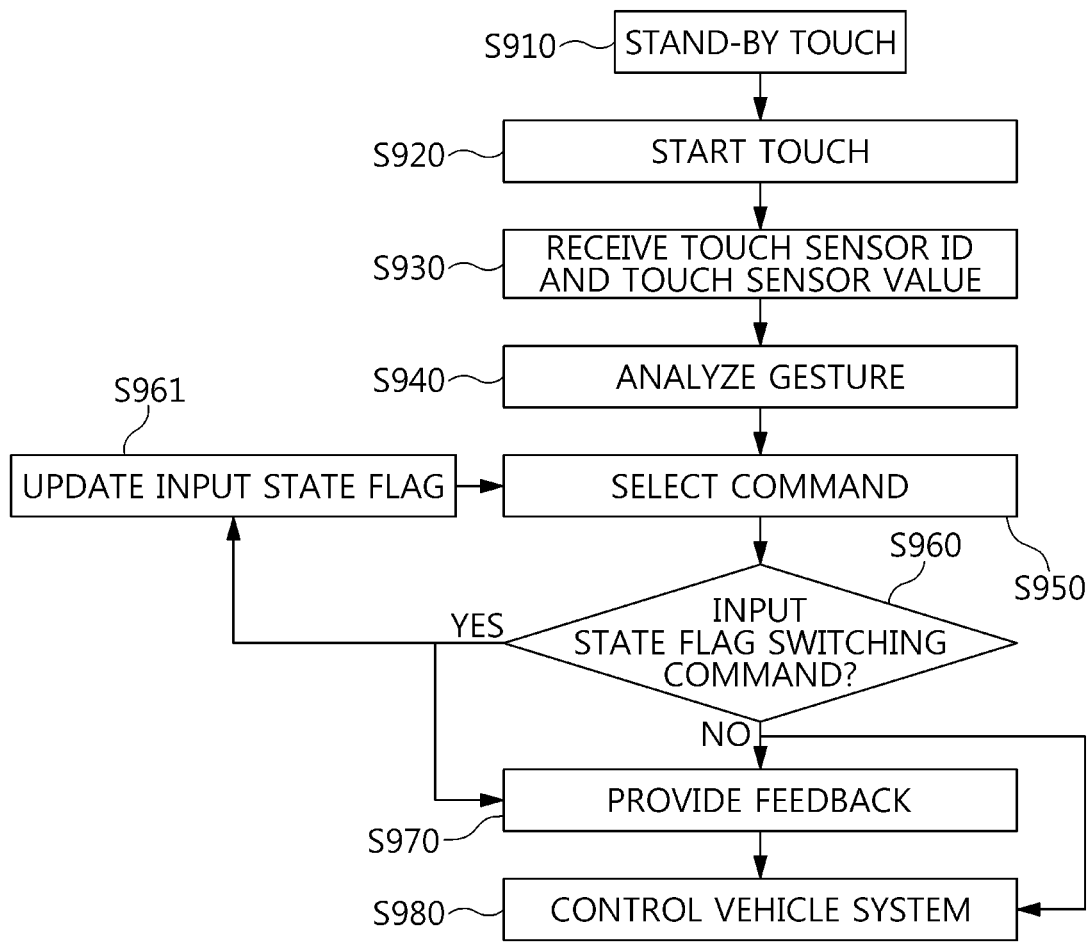
FIG. 9 is a flowchart illustrating a touch control process in accordance with an embodiment of the present disclosure.

FIG. 9 is a flowchart illustrating a touch control process in accordance with an embodiment of the present disclosure. Referring to FIG. 9, the control unit 120 receives a touch sensor ID, a touch sensor value, etc. when the user touches the touch sensor in the touch standby state S910, S920, S930. In addition, the touch sensor ID that can distinguish the left touch sensor, the central touch sensor, and the right touch sensor is received, and sensor values such as coordinates, touch intensity, etc. pressed by the touch sensor are received.

Then, the control unit 120 analyzes the gesture analysis-touch sensor value to distinguish the gesture input S940. The gesture input includes Tap, Double Tap, Force Tap, Swipe, Force Swipe, etc.

Then, the control unit 120 refers to the touch sensor ID, the distinguished gesture input, and the input state flag, and selects a command based on the command table S950.

Then, the control unit 120 determines whether or not the selected command is an input state flag switching command for switching the input state flag S960.

In the S960, when it is determined that the selected command is a command switching the input state flag, the input state flag is updated to refer to the command selection S961.

Then, the control unit 120 provides visual/auditory/tactile feedback corresponding to the received command with reference to the command table, and controls the vehicle system corresponding to the received command with reference to the command table S970, S980.

Figure 10:
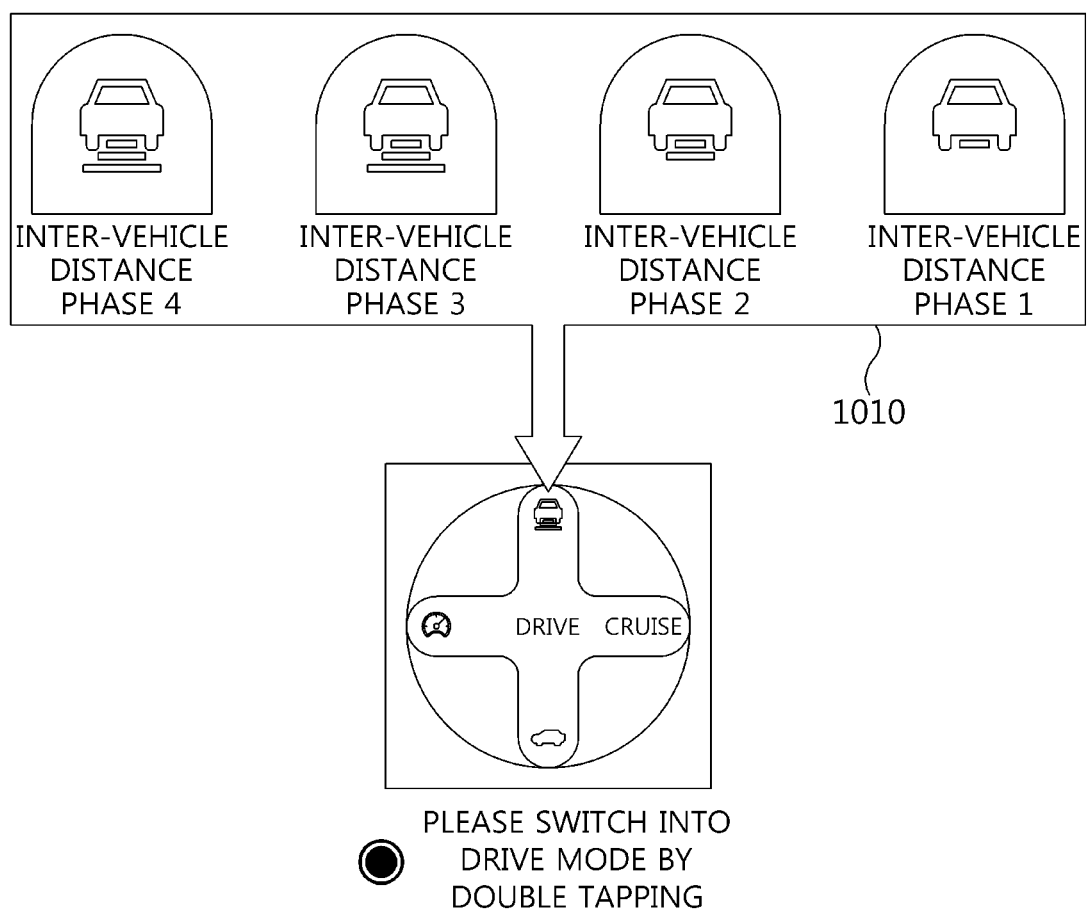
FIG. 10 is an example of a display for a vehicle function controlled on a user interface in accordance with an embodiment of the present disclosure.

FIG. 10 is an example of a display for a vehicle function controlled on a user interface in accordance with an embodiment of the present disclosure. Referring to FIG. 10, the state for the controlled vehicle function can be displayed in the form of an image and an icon. For example, when the Swipe Up gesture is performed in the left touch sensor 310 to execute an inter-vehicle distance, it can be expressed by the inter-vehicle distance stage icon 1010 at that time. In four stages, four bars can be posted below the vehicle icon. Of course, in three stages, three bars can be posted below the vehicle icon.

Figure 11:
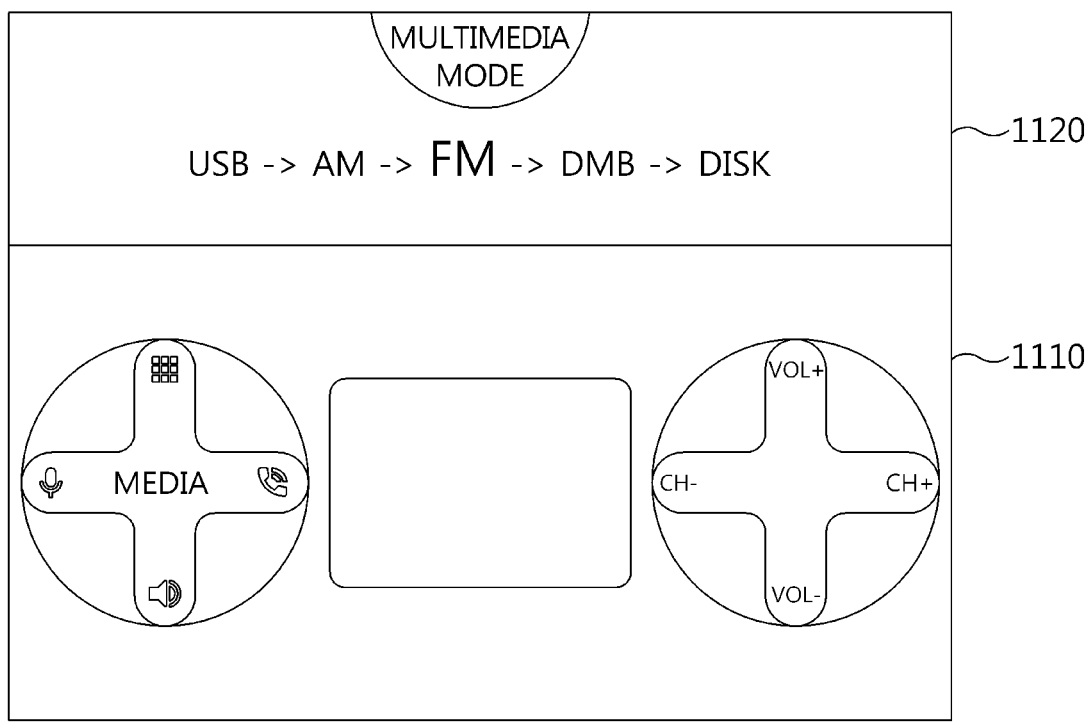
FIG. 11 is an example in which a user interface in accordance with an embodiment of the present disclosure and a description for a gesture input on the user interface are posted on the display.

FIG. 11 is an example in which a user interface in accordance with an embodiment of the present disclosure and a description for the gesture input on the user interface are posted on the display. Referring to FIG. 11, a description for the function executed through the gesture input can be posted on the HUD. For example, touch sensor images are displayed on the lower user interface 1110 of the HUD, and the state for the currently executed function can be confirmed on the upper user interface 1120 of the HUD. When the Swipe Up gesture is performed in the left touch sensor 310 to execute the multimedia mode function, the AV mode is switched, and the state thereof can be posted on the upper user interface of the HUD. Icons, images, and texts for the currently selected AV mode can be displayed visually, prominently with differentiation such as a color or a size compared to the AV mode that is not currently selected.

Figure 12:
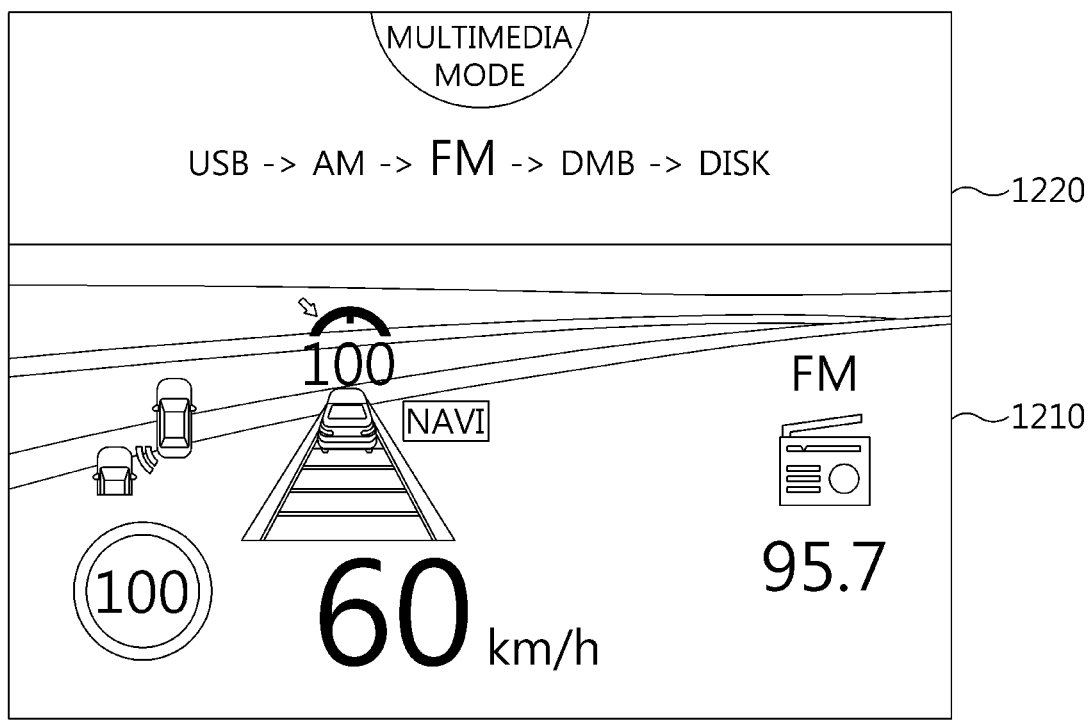
FIG. 12 is an example of a lower user interface configuration of a flexible display in the screen example illustrated in FIG. 11.

FIG. 12 is an example of a lower user interface configuration of a flexible display in the screen example illustrated in FIG. 11. Referring to FIG. 12, the lower user interface of the HUD can be changed to another UI by the elapse of a predetermined time or a separate setting. For example, when the gesture input does not occur during a predetermined time, the left, center, and right UIs disappear on the lower user interface of the HUD, and can be switched to an UI that posts vehicle information. In this time, when the touch input is performed in the touch sensor, the left, center, and right UIs of the HUD can be displayed again. In this time, the predetermined time at which the UI disappears can be adjusted by a setting.

Figure 13:
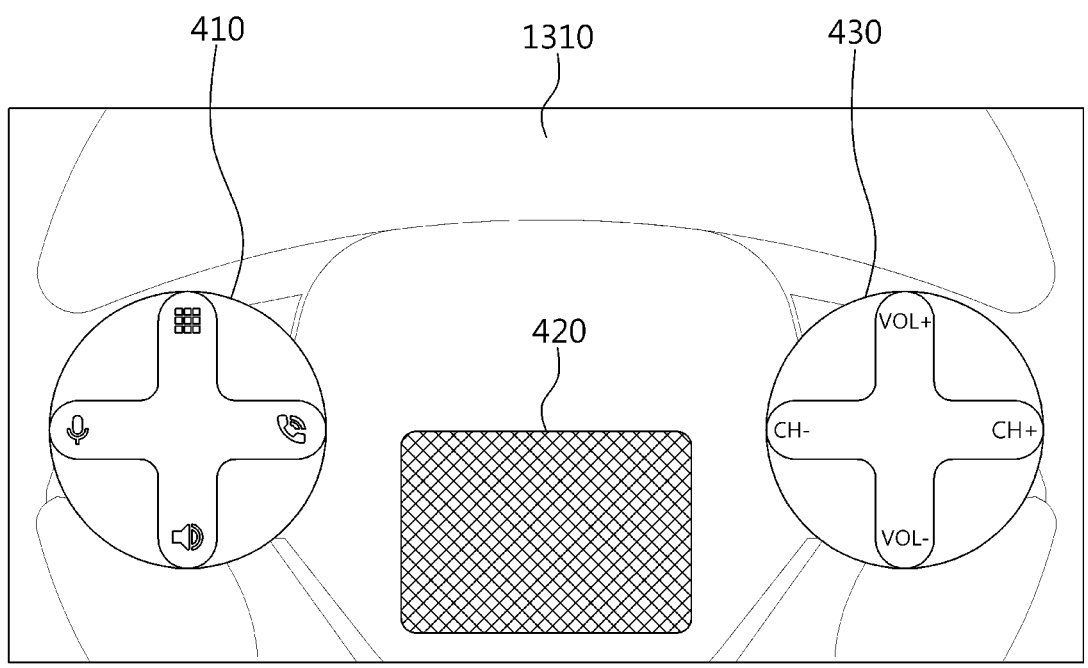
FIG. 13 is an example of changing the location of the touch sensor on the background of a user interface in accordance with an embodiment of the present disclosure.

FIG. 13 is an example of changing the location of the touch sensor on the background of a user interface in accordance with an embodiment of the present disclosure. Referring to FIG. 13, by locating a steering wheel image 1310 on the HUD UI background; and locating the left touch sensor icon 410, the central touch sensor icon 420, and the right touch sensor icon 430 to meet the location of each of the left, center, and right touch sensors applied to the steering wheel, it can guide for the user to easily perform the gesture input.

Figure 14:
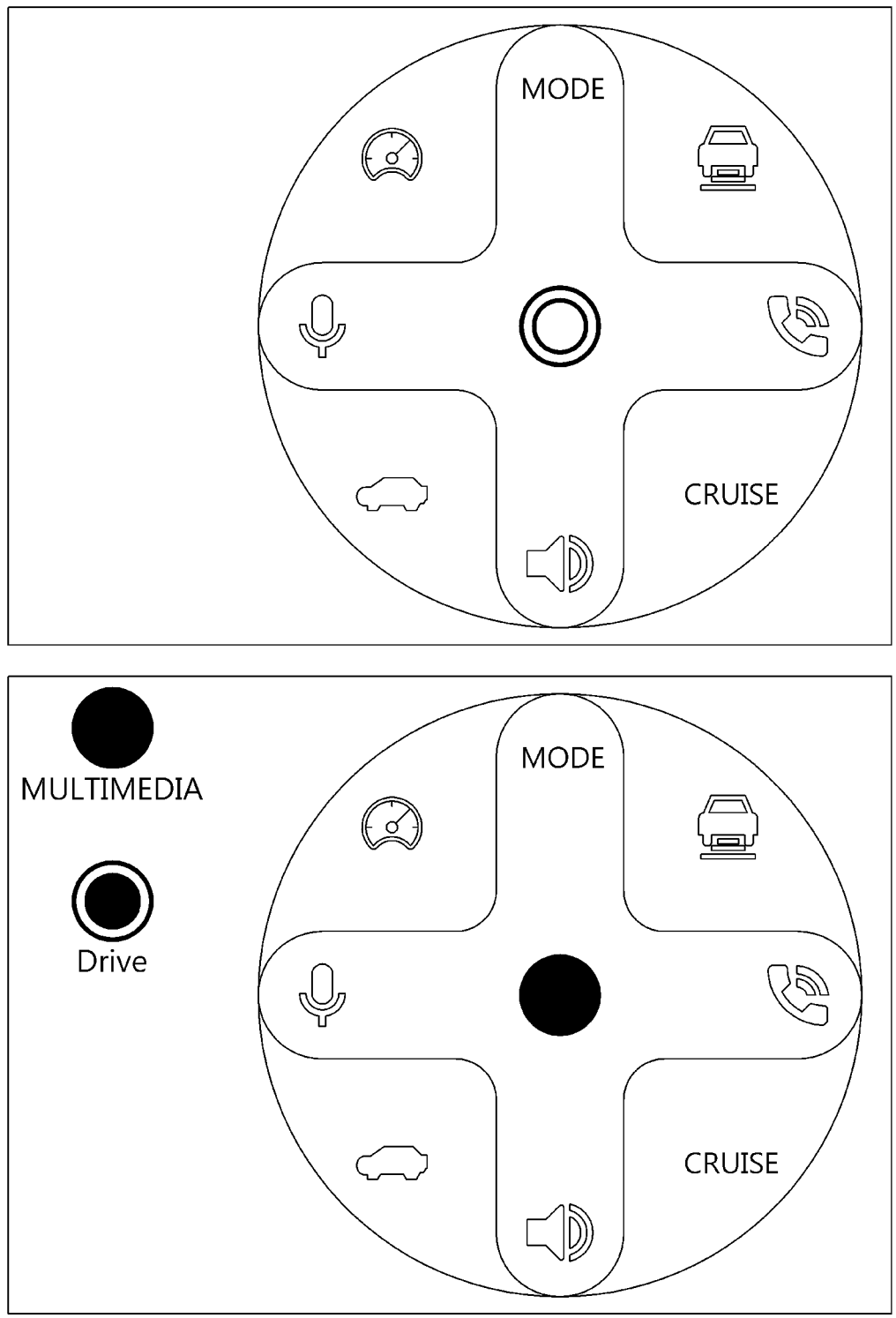
FIGS. 14 to 17 are examples of a user interface for switching Media Mode and Drive Mode in accordance with an embodiment of the present disclosure.

FIGS. 14 to 17 are examples of a user interface for switching the Media Mode and the Drive Mode in accordance with an embodiment of the present disclosure. Referring to FIG. 14, images, icons, etc. of a currently selectable Media Mode function are located at 12 o'clock, 3 o'clock, 6 o'clock, and 9 o'clock in the clockwise direction, and images and icons of a Drive Mode function are located between 12 o'clock and 3 o'clock, between 3 o'clock and 6 o'clock, between 6 o'clock and 9 o'clock, and between 9 o'clock and 12 o'clock. In this time, when the Media Mode is changed to the Drive Mode, the images of the Drive Mode function are located at the directions of 12 o'clock, 3 o'clock, 6 o'clock, and 9 o'clock, and the images of the Media Mode function are located between 12 o'clock and 3 o'clock, between 3 o'clock and 6 o'clock, between 6 o'clock and 9 o'clock, and between 9 o'clock and 12 o'clock. In this time, the icons, the size of the images, color, saturation, brightness, and transparency of the currently selectable function and the currently non-selectable function can be made various. In addition, the information on the current input mode can be posted on a part of the UI by a text, an image, an icon, etc.

Figure 15:
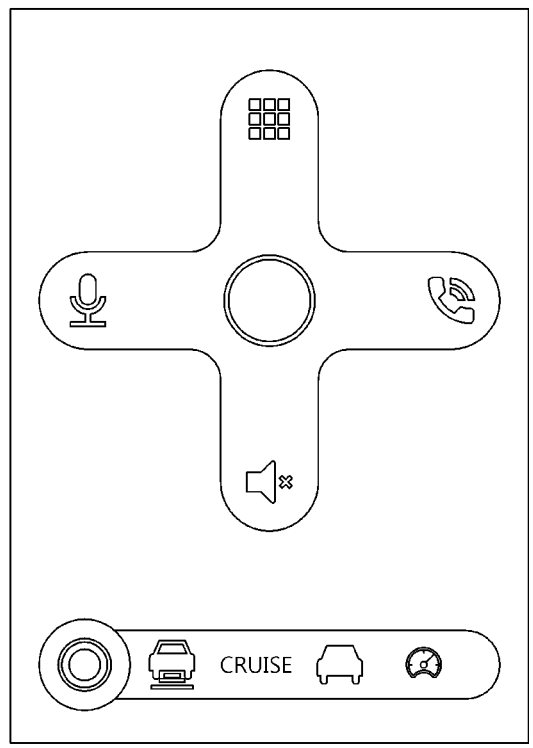
Figure 15:
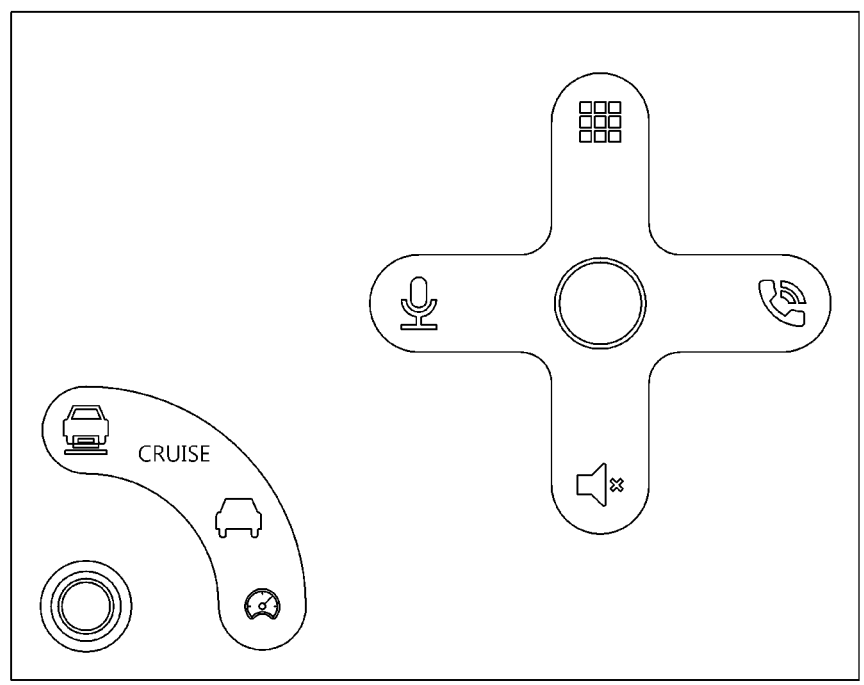

Referring to FIG. 15, the information on available functions upon the mode switching can be displayed on a part of the UI by a text, an image, an icon, etc.

Figure 16:
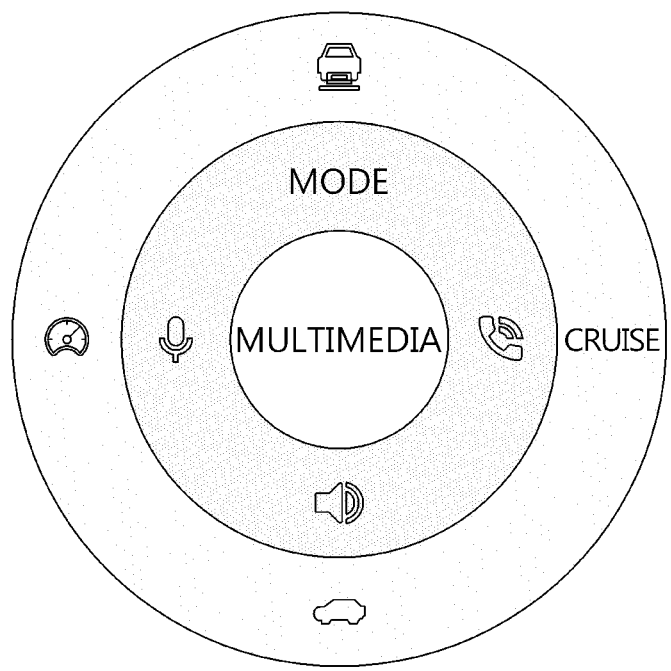

Referring to FIG. 16, the images and the icons of the currently selectable Media Mode function are located, and the images and the icons of the Drive Mode function can be located outside the Media Mode. In this time, the icons, the size of the images, color, saturation, brightness, transparency, etc. of the currently selectable function and the currently non-selectable function can be made various.

Figure 17:
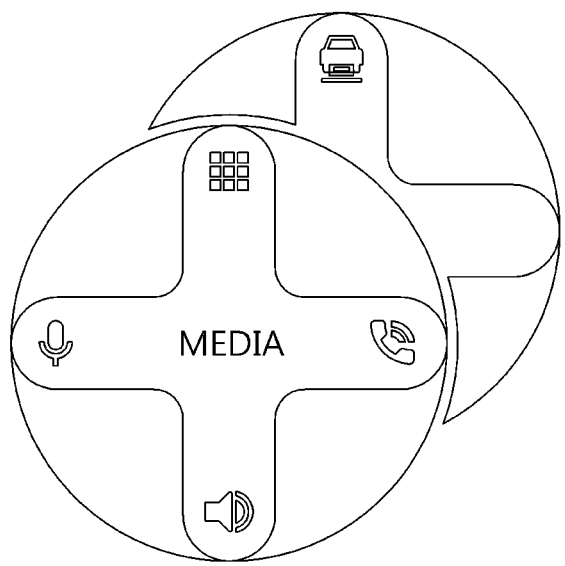

Referring to FIG. 17, the image of the currently selected Media Mode function, the UI layer and the image of the Drive Mode function related to the icon, and the UI layer related to the icon can be located to partially overlap with each other. In this time, the icons, the size of the images, color, saturation, brightness, transparency, etc. of the currently selectable function and the currently non-selectable function can be made various.

Figure 18:
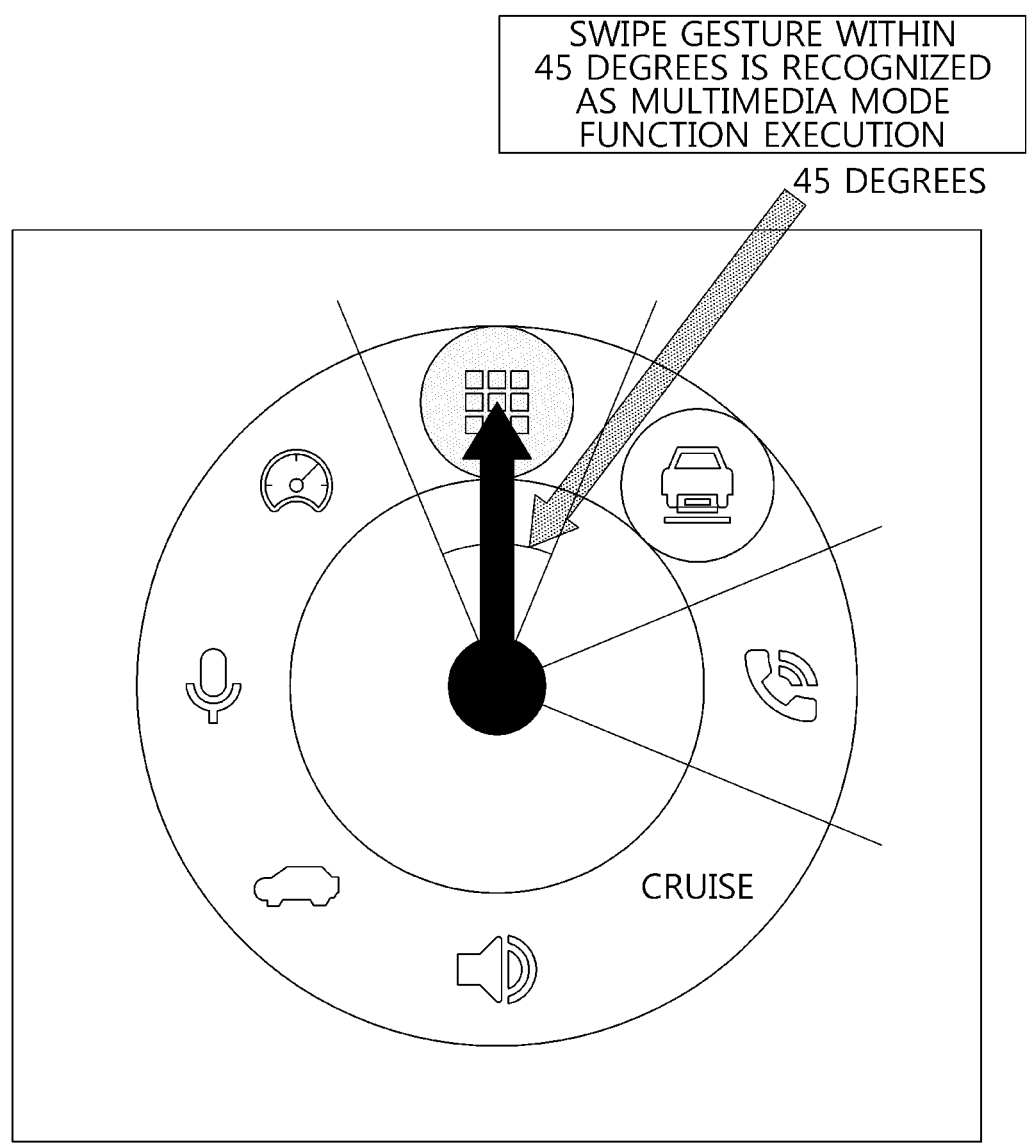
FIGS. 18 and 19 are examples of a user interface for executing each mode without switching Media Mode and Drive Mode in accordance with an embodiment of the present disclosure.
Figure 19:
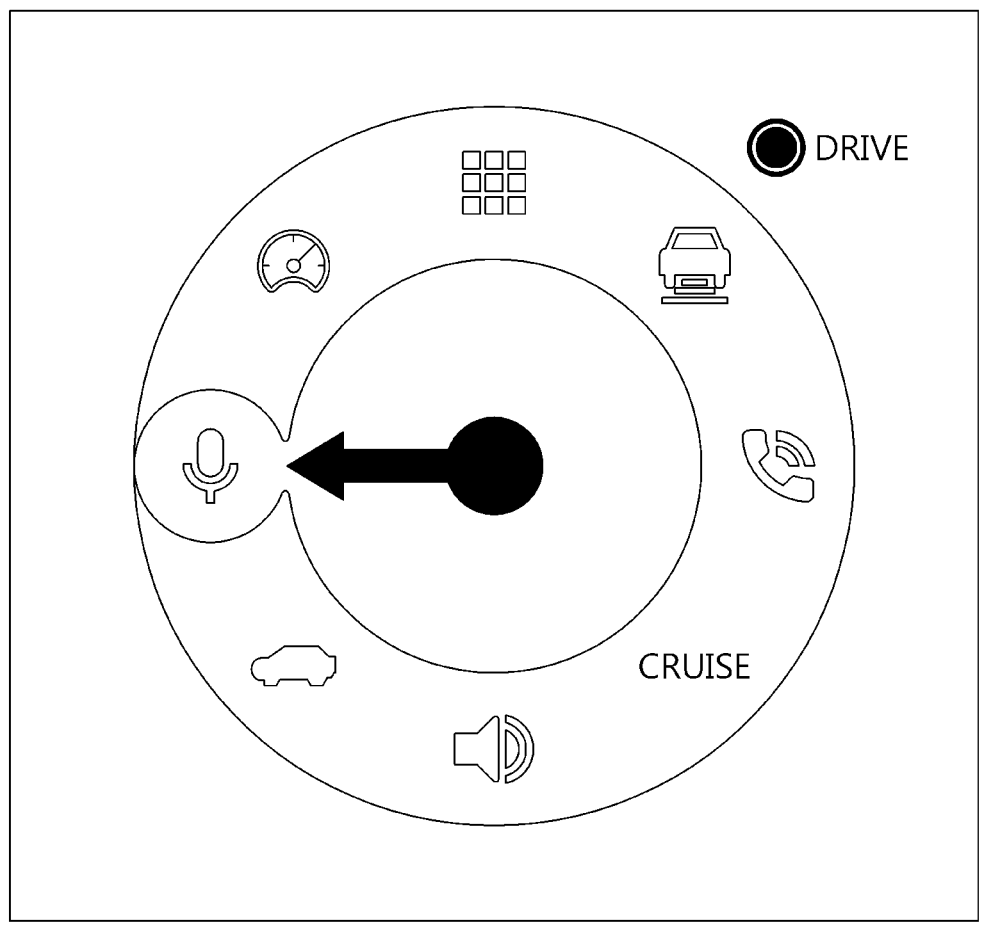

FIGS. 18 and 19 are examples of a user interface for executing each mode without switching the Media Mode and the Drive Mode in accordance with an embodiment of the present disclosure. Referring to FIGS. 18 and 19, for example, an icon, an image, and a text representing the function to be controlled can be located at eight directions in total, that is, 12 o'clock, 3 o'clock, 6 o'clock, and 9 o'clock, and between 12 o'clock and 3 o'clock, between 3 o'clock and 6 o'clock, between 6 o'clock and 9 o'clock, and between 9 o'clock and 12 o'clock.

The Swipe gesture can be used to execute a specific function. For example, when the direction of the Swipe is close to 12 o'clock, the function in the corresponding direction is executed. When the direction of the Swipe gesture is within a predetermined angle based on 12 o'clock, it can be determined that the gesture is intended to be at 12 o'clock even if it deviates from the 12 o'clock direction. For example, eight functions in total can be located at a 45° interval in a 360-degree circular UI, and it can be determined that when the absolute value of the angle between the straight line connecting the path from the start point of the Swipe gesture and the straight line connecting any point in the 12 o'clock direction from the start point of the Swipe gesture is within 22.5 degrees (45 degrees/2), the function in the 12 o'clock direction has been executed.

In this time, the icons, the size of the images, color, saturation, brightness, transparency, etc. of the currently selectable function and the currently non-selectable function can be made various.

Figure 20:
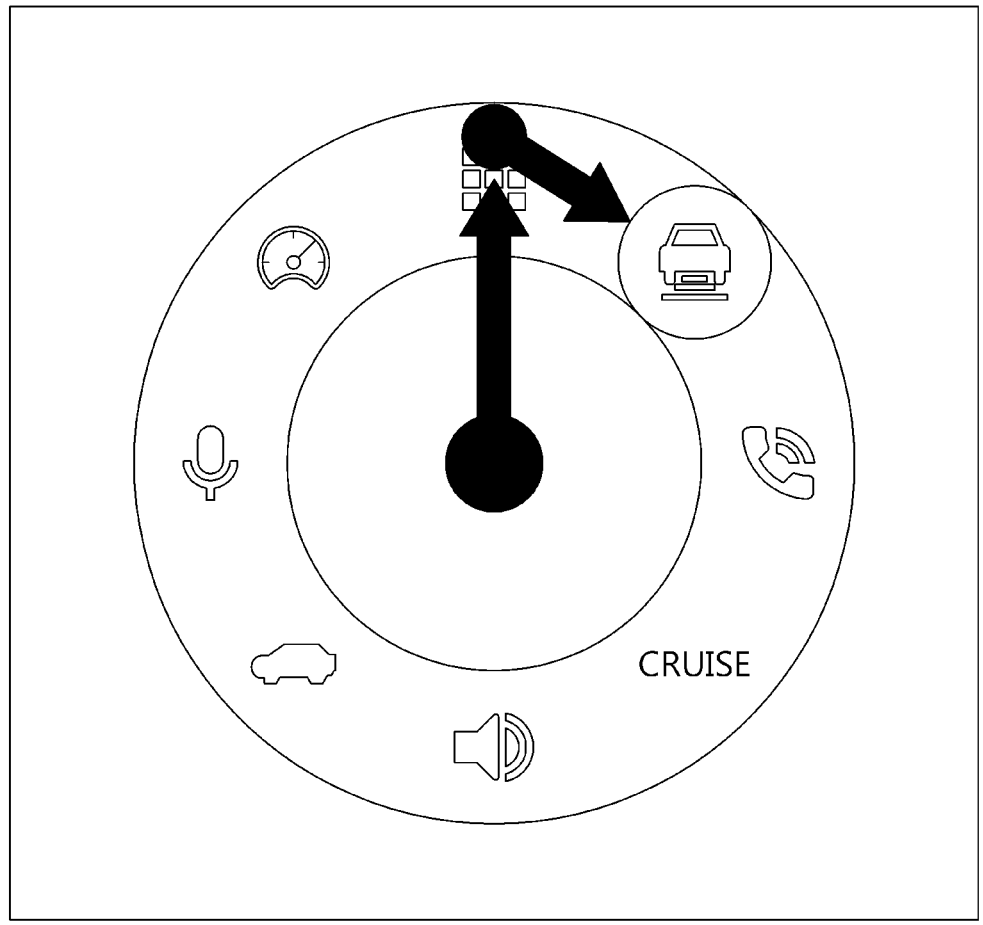
FIGS. 20 and 21 are examples of executing functions in a predetermined direction in accordance with an embodiment of the present disclosure.
Figure 21:
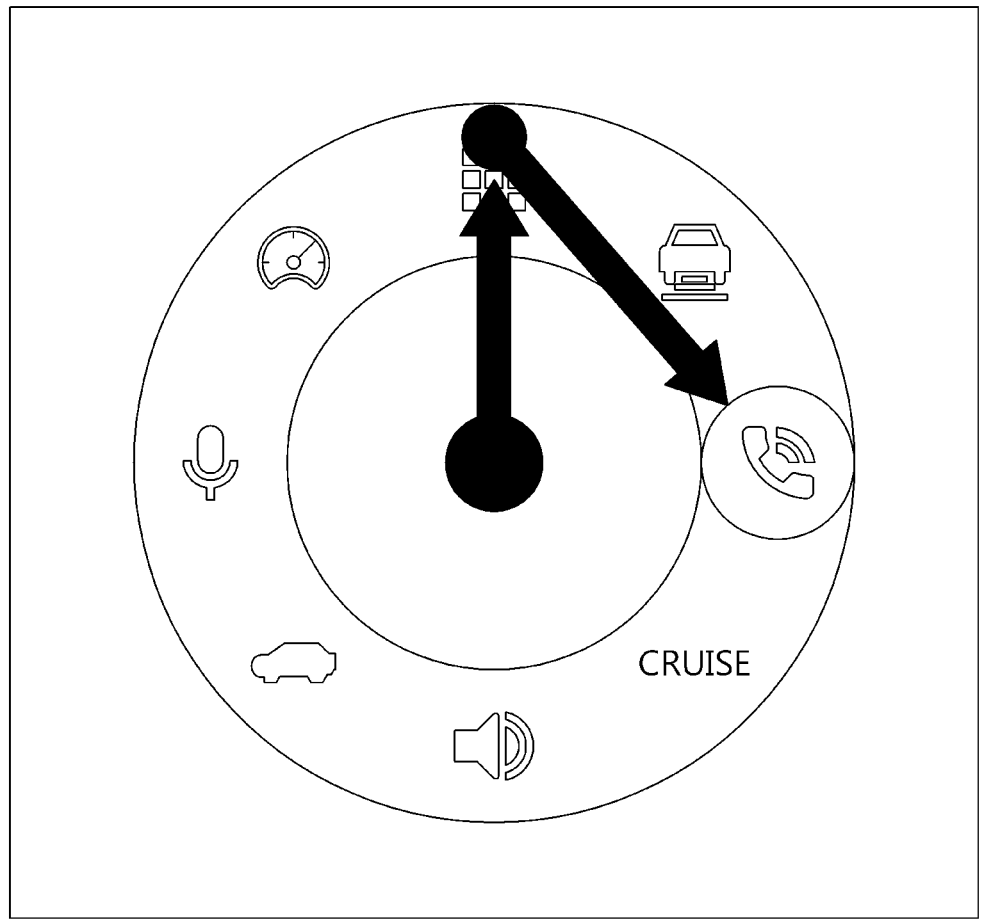

FIGS. 20 and 21 are examples of executing the function in a predetermined direction in accordance with an embodiment of the present disclosure. Referring to FIGS. 20 and 21, when the Swipe gesture is performed in a specific direction and the Swipe gesture is successively performed in a predetermined direction, the function in the predetermined direction rather than the function in the specific direction can be executed. For example, when the Swipe gesture is performed in a 12 o'clock direction and the Swipe gesture moving a predetermined distance in the right direction is successively performed, the inter-vehicle distance setting function in the right direction of the multimedia mode rather than the 12-way multimedia mode function can be executed. When the Swipe gesture is performed by further moving a predetermined distance, the call function in the right direction of the inter-vehicle distance setting can be performed.

In addition, the steps of the method or the algorithm explained regarding the embodiments disclosed herein are implemented as a program command format that can be performed through various computers means to be recorded in a computer readable medium. The computer readable medium can include a program (command) code, a data file, a data structure, etc. separately or a combination thereof.

The program (command) code recorded in the medium can be the ones specially designed or configured for the present disclosure, or can be the one known and available to those skilled in the computer software. Examples of the computer readable medium can include a magnetic media such as a hard disk, a floppy disk, and a magnetic tape, an optical media such as a CD-ROM, a DVD, and a Blue ray, and a semiconductor storage device specially configured to store and perform a program (command) code such as a ROM, a RAM, and a flash memory.

Herein, examples of the program (command) code include a high-level language code that can be executed by a computer using an interpreter, etc., as well as a machine language code made such as those produced by a complier. The hardware device can be configured to operate as one or more software modules in order to perform the operation of the present disclosure, and vice versa.

What is claimed is:

1. An apparatus for operating a touch control based steering wheel, comprising:
   a touch sensor for generating sensor-related information by measuring a surface location and intensity of a touch input to sense a gesture;
   a control unit for performing a corresponding function by analyzing the sensor-related information to generate touch input pattern information, and selecting a predetermined control command depending upon the touch input pattern information; and
   a feedback circuit for providing a feedback depending upon the control command, wherein the touch sensor comprises a left touch sensor located on a left-side surface of the steering wheel, a right touch sensor located on a right-side surface thereof, and a central touch sensor disposed between the left touch sensor and the right touch sensor, and
   wherein the central touch sensor is located at a center of the steering wheel below the left and right touch sensors,
   wherein the gesture is a combination of a plurality of single gestures, and
   wherein the plurality of single gestures includes a first gesture for dragging in a specific direction after touching a specific portion of the touch sensor to move a specific distance, a second gesture for pressing the specific portion of the touch sensor during a specific time, and a third gesture for pressing the specific portion of the touch sensor at a specific intensity during the specific time.

2. The apparatus for operating the touch control based steering wheel of claim 1, wherein the control unit further comprises:
   an analysis module for analyzing the gesture based on the sensor-related information;
   a selection module for selecting the control command with reference to the gesture and a predetermined command table; and
   a control module for controlling the feedback circuit by delivering the control command thereto.

3. The apparatus for operating the touch control based steering wheel of claim 2, wherein the sensor-related information comprises each unique identification sensor information, coordinates, and intensity information of the touch sensor.

4. The apparatus for operating the touch control based steering wheel of claim 3, wherein the control command is a command for executing a corresponding function, and the control command is mapped to the gesture and the each unique identification sensor information.

5. The apparatus for operating the touch control based steering wheel of claim 1, wherein the plurality of single gestures further includes a fourth gesture for tapping at least once with at least one point during the specific time, a fifth gesture for inputting a character, a sixth gesture for dragging with the at least one point, a seventh gesture for adjusting a distance between two points, and an eighth gesture for pressing a touch surface of the touch sensor more than a specific area.

6. The apparatus for operating the touch control based steering wheel of claim 1, wherein the feedback is at least any one of a visual feedback for displaying on a display, an auditory feedback for outputting through a speaker, and a tactile feedback for outputting through a pulse.

7. The apparatus for operating the touch control based steering wheel of claim 1, wherein the control command comprises an input state flag for switching between a plurality of menu modes.

8. The apparatus for operating the touch control based steering wheel of claim 1, wherein a haptic icon printed on a surface of the touch sensor is located on the steering wheel.

9. The apparatus for operating the touch control based steering wheel of claim 8, wherein the function is composed of an upper function and a lower function, and the left touch sensor and the right touch sensor are selectively mapped to the upper function and the lower function.

10. The apparatus for operating the touch control based steering wheel of claim 8, wherein the state for the function is displayed in the form of an image and an icon.

11. The apparatus for operating the touch control based steering wheel of claim 8, wherein a description screen for the function is divided on the display with a user interface of the touch sensor, or displayed on an entire screen thereof.

12. The apparatus for operating the touch control based steering wheel of claim 7, wherein the plurality of menu modes are located in a clockwise direction upon each mode switching, and the information on a selectable function in the menu mode is posted by combining a text, an image, and an icon.

13. The apparatus for operating the touch control based steering wheel of claim 7, wherein the currently selectable functions and the currently non-selectable functions upon each mode switching in the plurality of menu modes variously post an icon, the size of an image, color, saturation, brightness, and transparency.

14. The apparatus for operating the touch control based steering wheel of claim 7, wherein the plurality of menu modes are located to overlap a part thereof upon each mode switching, and the currently selectable functions and the currently non-selectable functions variously post an icon, the size of an image, color, saturation, brightness, and transparency.

15. The apparatus for operating the touch control based steering wheel of claim 7, wherein the plurality of menu modes are located in a clockwise directional donut shape without the mode switching, a corresponding function is executed by successively executing a specific gesture at least once in a specific direction at the central point of the donut shape, and the currently selectable functions and the currently non-selectable functions variously post an icon, the size of an image, color, saturation, brightness, and transparency.

16. A method of operating a touch control based steering wheel, comprising:
   generating, by a touch sensor, sensor-related information by measuring a surface location and intensity of a touch input to sense a gesture, wherein the touch sensor comprises a left touch sensor located on a left-side surface of the steering wheel, a right touch sensor located on a right-side surface thereof, and a central touch sensor disposed between the left touch sensor and the right touch sensor, and wherein the central touch sensor is located at a center of the steering wheel below the left and right touch sensors,
   wherein the gesture is a combination of a plurality of single gestures, and
   wherein the plurality of single gestures includes a first gesture for dragging in a specific direction after touching a specific portion of the touch sensor to move a specific distance, a second gesture for pressing the specific portion of the touch sensor during a specific time, and a third gesture for pressing the specific portion of the touch sensor at a specific intensity during the specific time;
   executing, by a control unit, a corresponding function by analyzing the sensor-related information to generate touch input pattern information, and selecting a predetermined control command depending upon the touch input pattern information; and
   providing a feedback, by a feedback circuit, depending upon the control command.

17. The method of operating the touch control based steering wheel of claim 16, wherein the executing further comprises:
   analyzing the gesture based on the sensor-related information;
   selecting the control command with reference to the gesture and a predetermined command table; and
   controlling the feedback circuit by delivering the control command thereto.

18. The method of operating the touch control based steering wheel of claim 17, wherein the sensor-related information comprises each unique identification sensor information, coordinates, and intensity information of the touch sensor.

* * * * *